(12) United States Patent
Iwashita et al.

(10) Patent No.: US 10,948,718 B2
(45) Date of Patent: Mar. 16, 2021

(54) HEAD-UP DISPLAY

(71) Applicant: Panasonic Intellectual Property Management Co., Ltd., Osaka (JP)

(72) Inventors: Tsutomu Iwashita, Osaka (JP); Tomoaki Miyamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 15/897,211

(22) Filed: Feb. 15, 2018

(65) Prior Publication Data
US 2018/0172991 A1 Jun. 21, 2018

Related U.S. Application Data

(63) Continuation of application No. PCT/JP2016/003819, filed on Aug. 23, 2016.

(30) Foreign Application Priority Data

Aug. 31, 2015 (JP) .............................. JP2015-169939

(51) Int. Cl.
G02B 27/14 (2006.01)
G02B 27/01 (2006.01)
(Continued)

(52) U.S. Cl.
CPC .......... *G02B 27/0101* (2013.01); *B60J 1/008* (2013.01); *G02B 27/0018* (2013.01);
(Continued)

(58) Field of Classification Search
None
See application file for complete search history.

(56) References Cited

U.S. PATENT DOCUMENTS 4,998,784 A 3/1991 Freeman et al.
7,643,215 B2 * 1/2010 Shin .................. G02B 27/0101
340/438
(Continued)

FOREIGN PATENT DOCUMENTS

JP 2-222920 9/1990
JP 7-195959 8/1995
(Continued)

OTHER PUBLICATIONS

International Search Report of PCT application No. PCT/JP2016/003819 dated Oct. 18, 2016.

*Primary Examiner* — Mustak Choudhury
(74) *Attorney, Agent, or Firm* — Wenderoth, Lind & Ponack, L.L.P.

(57) ABSTRACT

Head-up display includes: display element for displaying an image, and a projection optical system for projecting the image, which is displayed on display element, onto viewing region of viewer. The projection optical system includes combiner that is disposed at a position in an optical path from display element to viewing region of viewer. Combiner has a surface at which light incident from display element enters; the surface has a curved surface shape. Combiner has an effective region corresponding to viewing region of viewer. In the effective region, combiner has a horizontal cross-sectional shape that changes in thickness along from the center toward an end.

9 Claims, 18 Drawing Sheets

(51) Int. Cl.
*G02B 27/00* (2006.01)
*B60J 1/00* (2006.01)
*B60K 37/02* (2006.01)

(52) U.S. Cl.
CPC ........ *B60K 37/02* (2013.01); *B60K 2370/155* (2019.05); *B60K 2370/31* (2019.05); *B60K 2370/334* (2019.05); *B60K 2370/39* (2019.05); *G02B 2027/012* (2013.01); *G02B 2027/013* (2013.01)

(56) References Cited

U.S. PATENT DOCUMENTS

| | | | |
|---|---|---|---|
| 7,700,179 B2 * | 4/2010 | Travis | ................. B32B 3/00 428/156 |
| 2002/0008926 A1 | 1/2002 | Freeman | |
| 2013/0188260 A1 * | 7/2013 | Matsushita | ........ G02B 27/0101 359/632 |
| 2015/0338649 A1 | 11/2015 | Nambara | |

FOREIGN PATENT DOCUMENTS

| | | |
|---|---|---|
| JP | 8-099561 | 4/1996 |
| JP | 2012-058688 | 3/2012 |
| JP | 2014-115417 | 6/2014 |

* cited by examiner

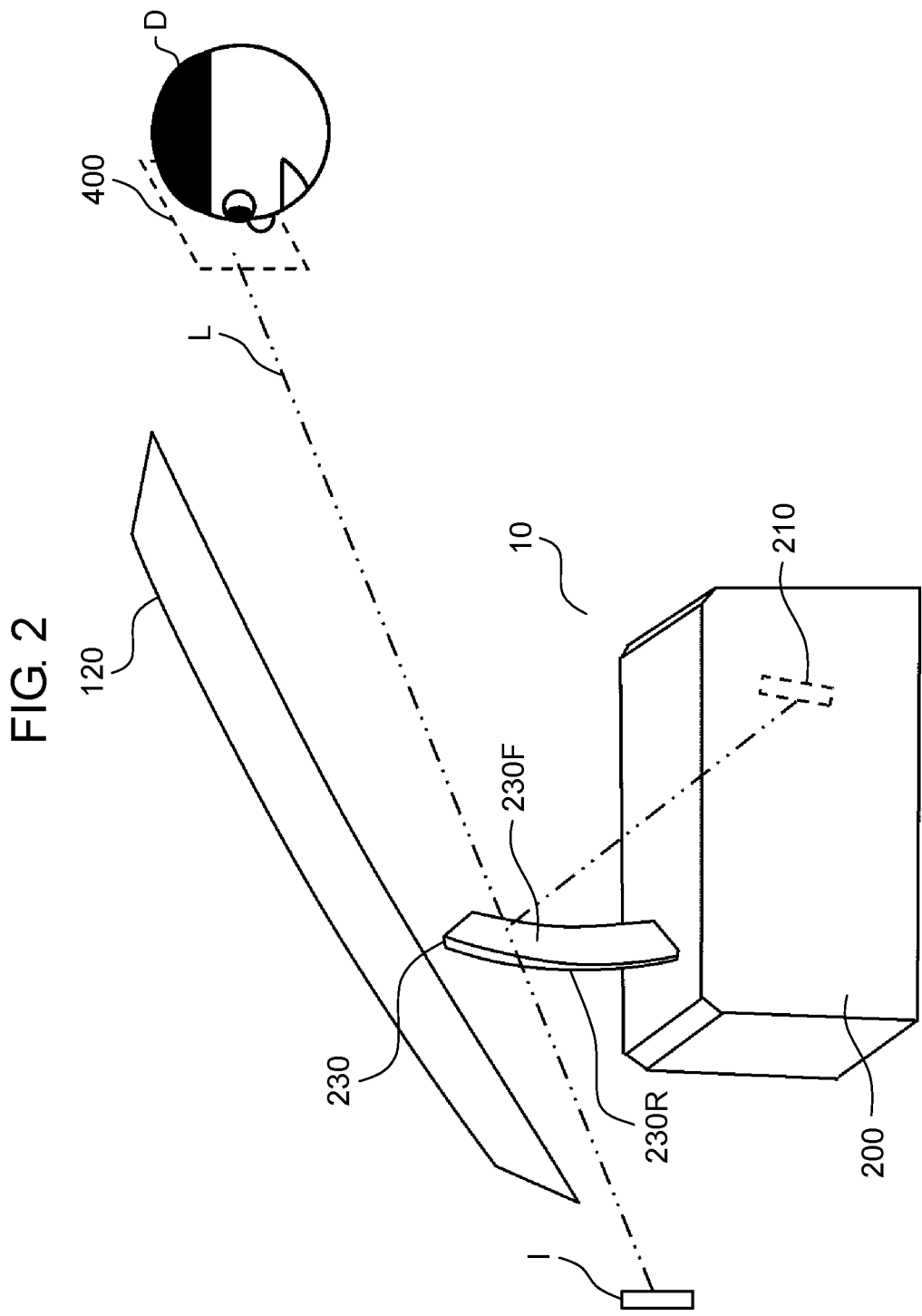

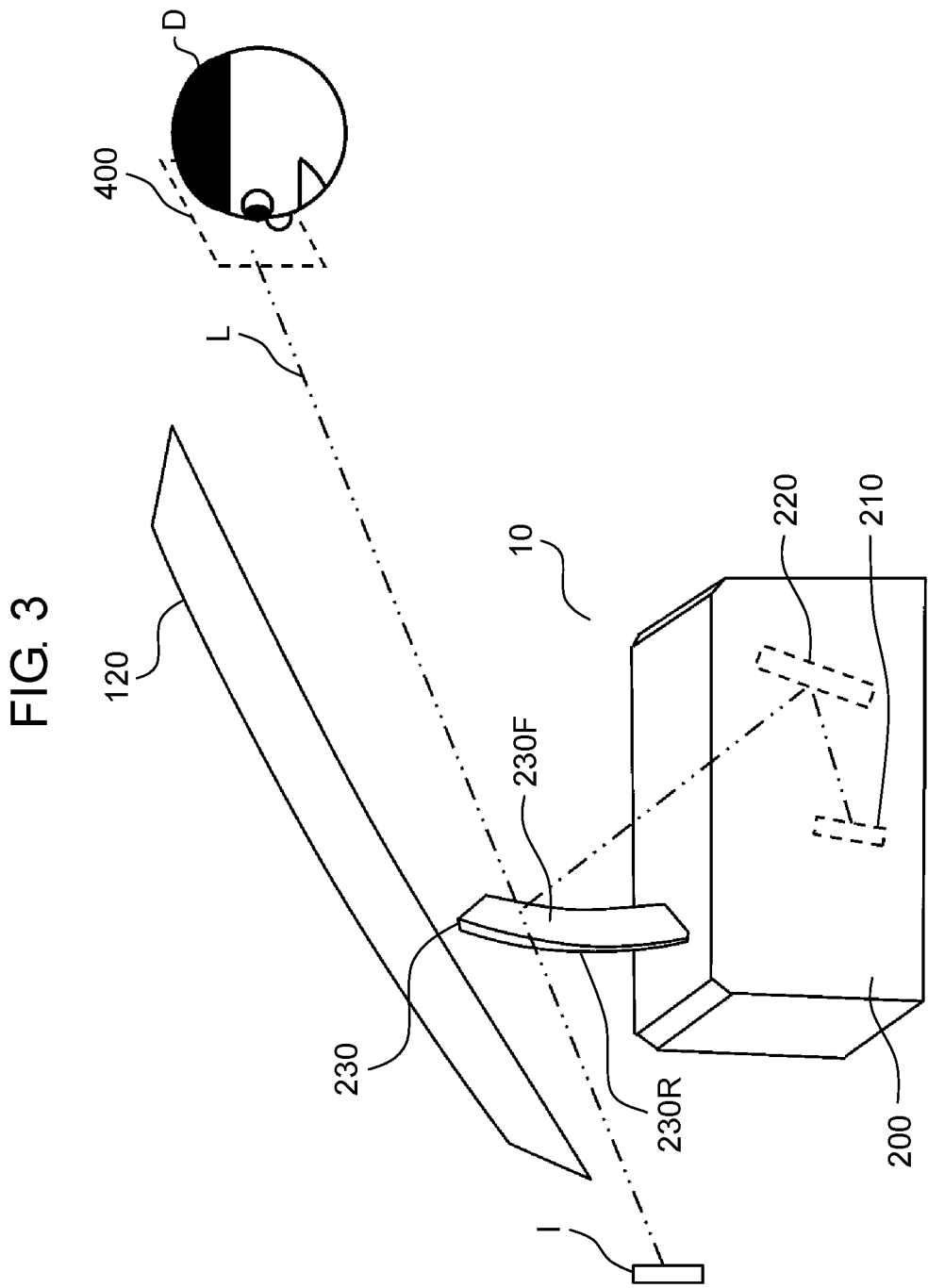

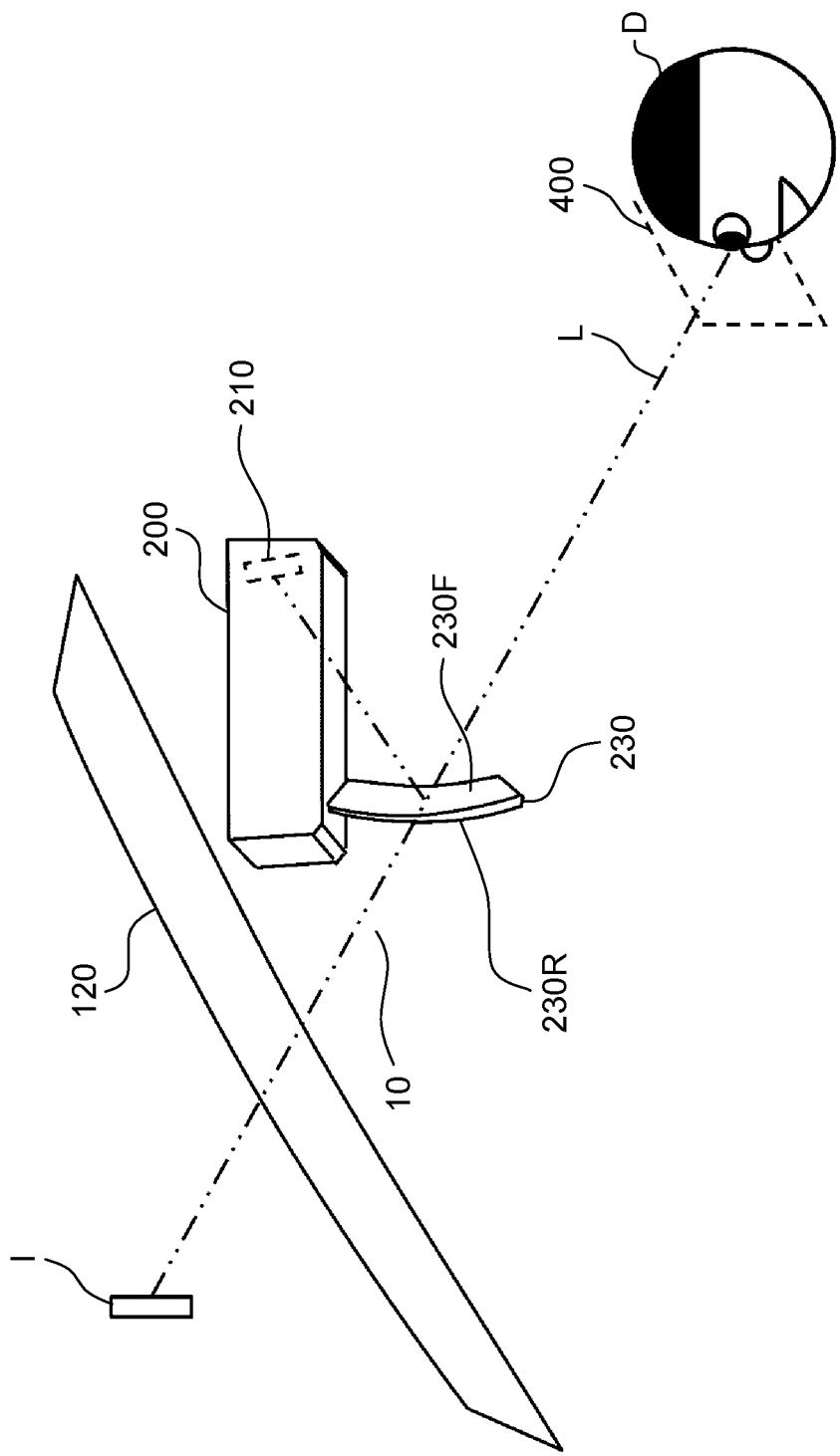

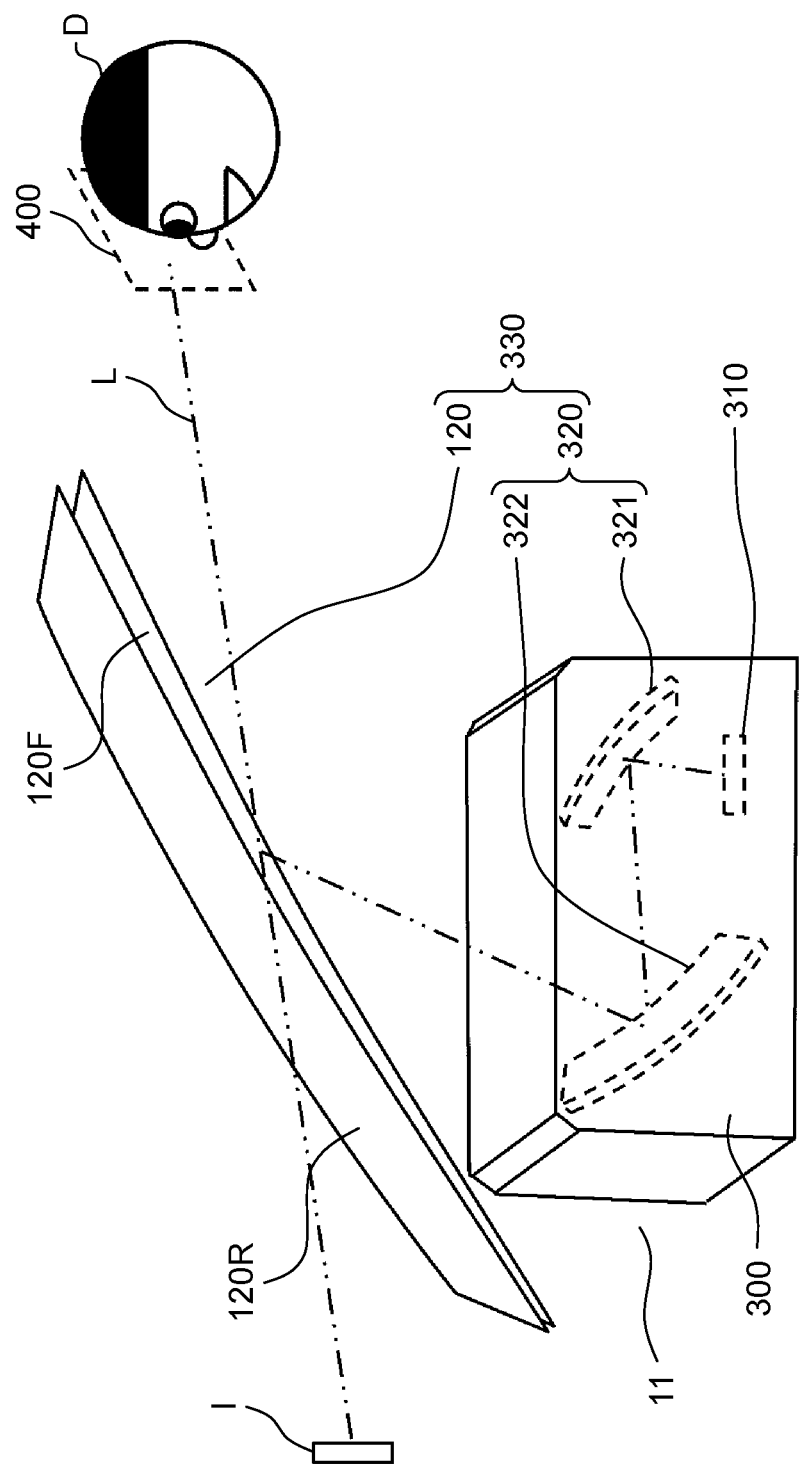

FIG. 6A
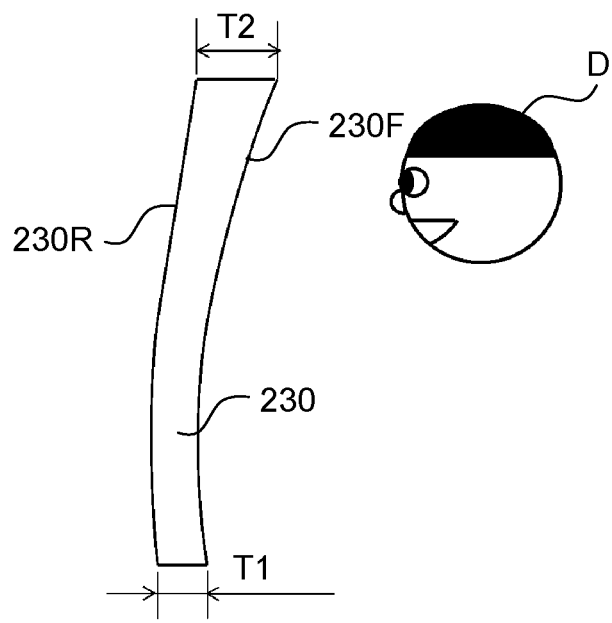
FIG. 6B
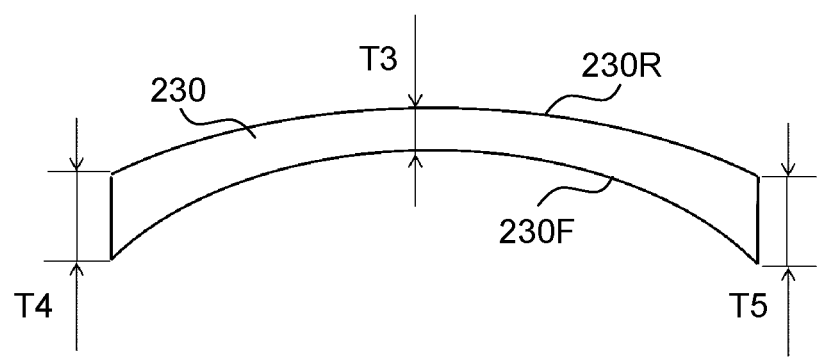
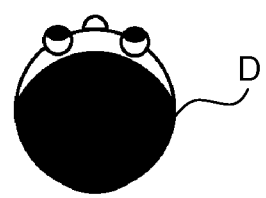

FIG. 7A
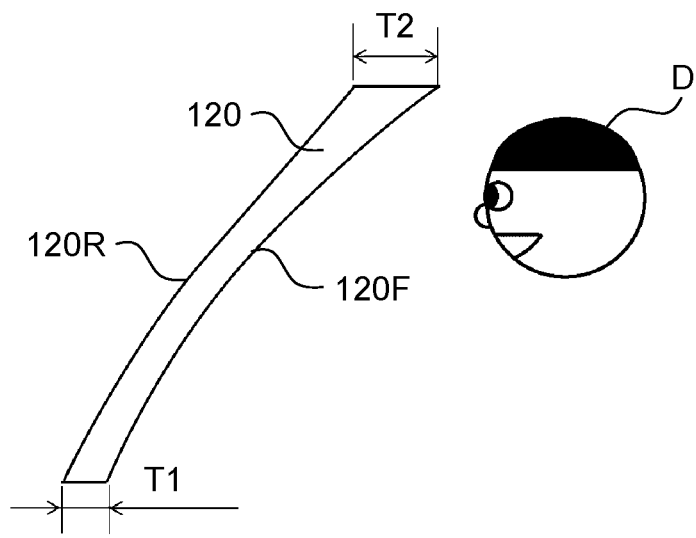
FIG. 7B
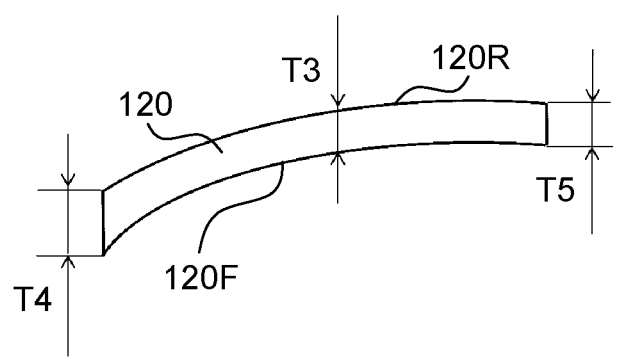
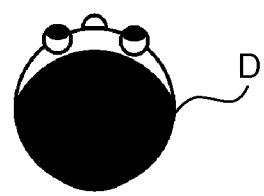

HEAD-UP DISPLAY

BACKGROUND

1. Technical Field

The present disclosure relates to head-up displays which allow viewers to visually recognize display images that are presented as virtual images via reflection means.

2. Description of the Related Art

Japanese Patent Unexamined Publication No. 2012-58688 discloses a head-up display that enables a visually clear recognition of a virtual image of a display image, at a magnification of not smaller than 1 (one), while preventing the virtual image from being viewed as unfavorable double images. Such double images will be caused when the display image is reflected in both the front and rear surfaces of a combiner.

SUMMARY

The present disclosure is intended to provide a head-up display which can prevent a virtual image from being visually recognized as double images over the entire region of a viewing region of a viewer, with the virtual image being reflected in the front and rear surfaces of a combiner, windshield, or the like.

A head-up display according to a first aspect of the present disclosure includes: a display element for displaying an image, and a projection optical system for projecting the image displayed on the display element onto a viewing region of a viewer. The projection optical system includes a combiner disposed at a position in an optical path from the display element to the viewing region of the viewer. The combiner includes a surface at which light incident from the display element enters. The surface of the combiner has a curved surface shape. The combiner has an effective region corresponding to the viewing region of the viewer. In the effective region, the combiner has a horizontal cross-sectional shape that changes in thickness along from the center of the combiner toward the end of the combiner. Specifically, if the viewer looks down the combiner, the effective region of the combiner is configured to have a longitudinal cross-sectional shape in which the thickness of the combiner gradually decreases from the upper end to the lower end. If the viewer looks down the combiner, the effective region of the combiner is configured to have a longitudinal cross-sectional shape in which the thickness of the combiner gradually decreases from the upper end to the lower end. If the viewer is a driver of the left hand steering wheel vehicle, the effective region of the combiner is configured to have a transverse cross-sectional shape in which the thickness of the combiner gradually increases from the center to the left end when viewed from the viewer. If the viewer is a driver of the right hand steering wheel vehicle, the effective region of the combiner is configured to have a traverse cross-sectional shape in which the thickness of the combiner gradually increases from the center to the right end when viewed from the viewer.

A head-up display according to a second aspect of the present disclosure includes: a display element for displaying an image, and a projection optical system for projecting the image displayed on the display element onto a viewing region of a viewer. The projection optical system includes a windshield disposed at a position in an optical path from the display element to the viewing region of the viewer. The windshield includes a surface at which light incident from the display element enters. The surface of the windshield has a curved surface shape. The windshield has an effective region corresponding to the viewing region of the viewer. In the effective region, the windshield has a horizontal cross-sectional shape that changes in thickness along from the center of the windshield toward the end of the windshield. Specifically, if the viewer looks down the windshield, the effective region of the windshield is configured to have a longitudinal cross-sectional shape in which the thickness of the windshield gradually decreases from the upper end to the lower end. If the viewer looks up the windshield, the effective region of the windshield is configured to have a longitudinal cross-sectional shape in which the thickness of the windshield gradually decreases from the lower end to the upper end. If the viewer is a driver of the left hand steering wheel vehicle, the effective region of the windshield is configured to have a transverse cross-sectional shape in which the thickness of the windshield gradually increases from the center to the left end when viewed from the viewer. If the viewer is a driver of the right hand steering wheel vehicle, the effective region of the windshield is configured to have a transverse cross-sectional shape in which the thickness of the windshield gradually increases from the center to the right end when viewed from the viewer.

BRIEF DESCRIPTION OF THE DRAWINGS

FIG. 2 is a schematic cross-sectional view for illustrating an optical configuration of a head-up display according to a first embodiment;

FIG. 3 is a schematic cross-sectional view for illustrating an optical configuration of a head-up display according to a second embodiment;

FIG. 4 is a schematic cross-sectional view for illustrating an optical configuration of a head-up display according to a third embodiment;

FIG. 5 is a schematic cross-sectional view for illustrating an optical configuration of a head-up display according to a fifth embodiment;

FIG. 6A is a longitudinal cross-sectional view of a combiner according to the first and second embodiments, with the view being taken along the vertical plane passing through the center of the combiner;

FIG. 6B is a transverse cross-sectional view of the combiner according to the first and second embodiments, with the view being taken along the horizontal plane passing through the center of the combiner;

FIG. 7A is a longitudinal cross-sectional view of a windshield according to the fifth embodiment, with the view being taken along the vertical plane passing through the center of the windshield;

FIG. 7B is a transverse cross-sectional view of the windshield according to the fifth embodiment, with the view being taken along the horizontal plane passing through the center of the windshield;

DETAILED DESCRIPTION

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art and, therefore, are not intended to impose any limitations on the subject matter described in the appended claims.

1. Configuration

Hereinafter, a head-up display according to first to fifth embodiments will be described with reference to accompanying drawings.

Figure 1:
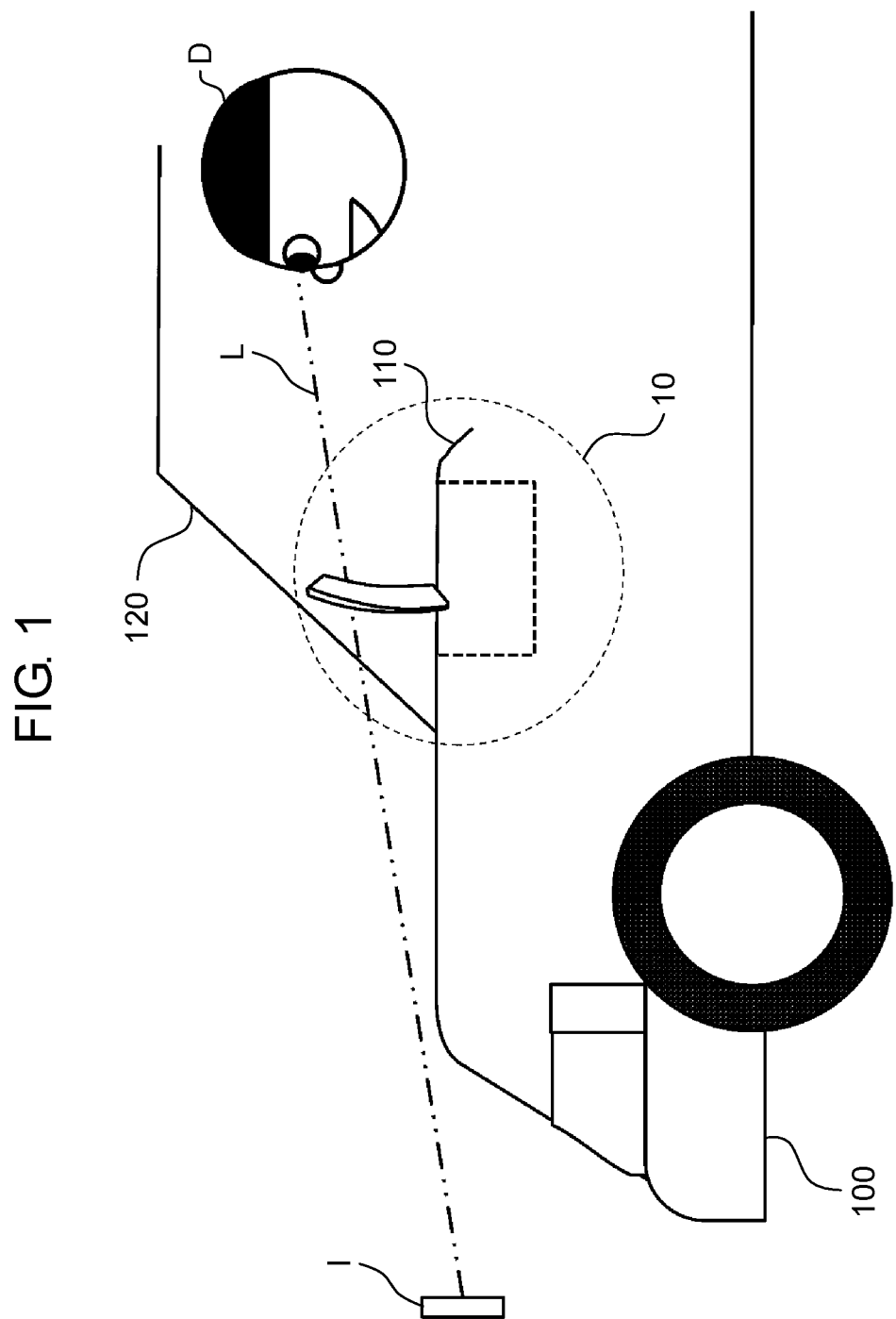
FIG. 1 is a schematic cross-sectional view of a vehicle equipped with a head-up display according to the present disclosure.

FIG. 1 is a schematic view of vehicle 100 equipped with head-up display 10 according to the first to fourth embodiments. As shown in FIGS. 1 and 2, head-up display 10 according to the first to fourth embodiments is configured with combiner 230 and a member which is disposed in dashboard 110 located below windshield 120 of vehicle 100. Viewer "D" (usually a driver of vehicle 100), who is in the inside of vehicle 100, visually recognizes virtual image "I" via head-up display 10. Optical path "L" is indicated in each of the Figures. Moreover, as shown in FIGS. 1 and 5, a head-up display according to the fifth embodiment is configured with windshield 120 and a member which is disposed in dashboard 110.

First Exemplary Embodiment

FIG. 2 is a schematic view of head-up display 10 according to the first embodiment. As shown in FIG. 2, head-up display 10 includes case 200, display element 210, and combiner 230. Combiner 230 is disposed at a central portion when viewed from viewer "D." Head-up display 10 is one that works as follows: An image displayed on display element 210 is reflected via front surface 230F of combiner 230. The reflected image is guided to viewing region 400 of viewer "D" in the inside of vehicle 100, thereby allowing the viewer to view virtual image "I" of the image. Here, the viewing region is a region in which viewer "D" will moves the viewer's eyes to look. The viewer can visually recognize virtual image "I" when the viewer moves the eyes to look in the viewing region. Head-up display 10 includes a projection optical system that projects the image, which is displayed on display element 210, onto viewing region 400 of viewer "D." The projection optical system includes combiner 230 disposed at a position in an optical path from display element 210 to viewing region 400 of viewer "D."

Second Exemplary Embodiment

FIG. 3 is a schematic view of head-up display 10 according to the second embodiment. As shown in FIG. 3, head-up display 10 includes case 200, display element 210, reflection element (reflecting mirror) 220, and combiner 230. Combiner 230 is disposed at a central portion when viewed from viewer "D." Head-up display 10 is one that works as follows: An image displayed on display element 210 is reflected via reflection element 220 and front surface 230F of combiner 230. The reflected image is guided to viewing region 400 of viewer "D" in the inside of vehicle 100, thereby allowing the viewer to view virtual image "I" of the image. Head-up display 10 includes a projection optical system that projects the image, which is displayed on display element 210, onto viewing region 400 of viewer "D." The projection optical system includes reflection element 220 and combiner 230 which are disposed at respective positions in an optical path from display element 210 to viewing region 400 of viewer "D." FIG. 3 shows the case where one reflection element 220 is used to guide a ray of light from display element 210 to combiner 230; however, a plurality of reflection elements 220 may be used.

Third Exemplary Embodiment

FIG. 4 is a schematic view of head-up display 10 according to the third embodiment. As shown in FIG. 4, head-up display 10 includes case 200, display element 210, and combiner 230. Combiner 230 is disposed at a central portion when viewed from viewer "D." Head-up display 10 is one that works as follows: An image displayed on display element 210 is reflected via front surface 230F of combiner 230. The reflected image is guided to viewing region 400 of viewer "D" in the inside of vehicle 100, thereby allowing the viewer to view virtual image "I" of the image. Head-up display 10 includes a projection optical system that projects the image, which is displayed on display element 210, onto viewing region 400 of viewer "D." The projection optical system includes combiner 230 disposed at a position in an optical path from display element 210 to viewing region 400 of viewer "D."

Fourth Exemplary Embodiment

Head-up display 10 according to the fourth embodiment has substantially the same configuration as head-up display 10 (FIG. 3) according to the second embodiment except that the positions of their combiners 230 are different from each other. In head-up display 10 according to the second embodiment, combiner 230 is disposed at the central portion when viewed from viewer "D." That is, the longitudinal center line (the longitudinal line passing through the center in the width) of combiner 230 is aligned with the line of sight of viewer "D." In contrast, in head-up display 10 according to the fourth embodiment, combiner 230 is disposed on the right when viewed from viewer "D." That is, when viewed from viewer "D," the longitudinal center line of combiner 230 is located at a position shifted to the right side of the line of sight of viewer "D."

Fifth Exemplary Embodiment

FIG. 5 is a schematic view of head-up display 10 according to the fifth embodiment. As shown in FIG. 5, head-up display 11 includes case 300, display element 310, and projection optical system 330. Projection optical system 330 includes: windshield 120, and reflection element group 320 that is configured with first reflection element 321 and second reflection element 322. Head-up display 11 is one that works as follows: An image displayed on display element 310 is reflected via reflection element group 320 and front surface 120F of windshield 120. The reflected image is guided to viewing region 400 of viewer "D" in the inside of vehicle 100, thereby allowing the viewer to view virtual image "I" of the image. Projection optical system 330 is one that projects the image displayed on display element 310 onto viewing region 400 of viewer "D." The projection optical system includes windshield 120 disposed at a position in an optical path from display element 310 to viewing region 400 of viewer "D." For guiding a ray of light from display element 310 to windshield 120, the image displayed on display element 310 may be directly projected onto windshield 120 without using reflection element group 320. Projection optical system 330 may include a single reflection element or, alternatively, not smaller than 3 (three) reflection elements. Projection optical system 330 may include a lens element.

Head-up display 10 according to each of the first to fourth embodiments includes case 200; however, case 200 is not an essential constituent element. Instead of case 200, dashboard 110 of vehicle 100 may have the function of the case.

Head-up display 11 according to the fifth embodiment includes case 300; however, case 300 is not an essential constituent element. Instead of case 300, dashboard 110 of vehicle 100 may have the function of the case.

The image information displayed on elements 210 and 310 is controlled by a controller, not shown, such as a microprocessor. The image information may contain a variety of information that includes an engine rotational speed, vehicle speed, turn signal, road guidance display, following distance, remaining battery life, and current vehicle speed. Each of display elements 210 and 310 may employ a liquid crystal display, organic light-emitting diode (electroluminescence) display, fluorescent indicator (seven-segment display), or plasma display. Instead of display elements 210 and 310, a projector or a scanning laser can be used.

2. Advantages and Others

Hereinafter, advantages and others of head-up displays 10 and 11 that are configured as described above will be described, with reference to the drawings.

In head-up display 10 shown in FIGS. 2 to 4, the ray of light having exited from display element 210 is reflected to form two display lights, i.e. a display light that is reflected off front surface 230F of combiner 230 and a display light that is reflected off rear surface 230R of the combiner. If these display lights are shifted from each other, it causes viewer "D" to view them as double images, resulting in a serious degradation in image quality. Likewise, in head-up display 11 shown in FIG. 5, the ray of light having exited from display element 310 is reflected to form two display lights, i.e. a display light that is reflected off front surface 120F of the windshield and a display light that is reflected off rear surface 120R of the windshield. If these display lights are shifted from each other, it causes viewer "D" to view them as double images, resulting in a serious degradation in image quality.

FIG. 6A is a longitudinal cross-sectional view of combiner 230, with the view being taken along the vertical plane passing through the center of an effective region of the combiner 230. FIG. 6B is a transverse cross-sectional view of combiner 230, with the view being taken along the horizontal plane passing through the center of the effective region of the combiner 230. Front surface 230F of combiner 230 is a surface on the side from which the ray of light having exited from display element 210 enters. Rear surface 230R is on the opposite side of the combiner from front surface 230F.

As shown in FIG. 6A, the effective region of combiner 230 has a cross-sectional shape in which the thickness of the combiner gradually changes from thickness T1 of the lower portion of the combiner to thickness T2 of the upper portion. In addition, as shown in FIG. 6B, the effective region of combiner 230 has a cross-sectional shape in which the thickness of the combiner gradually changes from thickness T3 of the central portion of the combiner to thicknesses T4 and T5 of the ends on the left and right sides, respectively. Here, each of the directional terms "upper," "lower," "left," and "right" used herein indicates the corresponding direction when viewed from viewer "D." The terms "center of combiner 230" used herein indicate the intersection point of combiner 230 with the line that connects the center of viewing region 400 to the center of virtual image "I." The terms "upper end," "lower end," "left end," and "right end" of combiner 230 used herein indicate the upper end, lower end, left end, and right end of the effective region of combiner 230, respectively. The effective region of combiner 230 is a region, in combiner 230, that corresponds to viewing region 400 of viewer "D." Such a region in combiner 230 is one in which viewer "D" can visually recognize virtual image "I" when looking in combiner 230 from viewing region 400.

FIG. 6A shows the case where thickness T2 of the upper end is larger than thickness T1 of the lower end, with the thickness monotonically increasing from the lower end to the upper end. However, the thickness T2 is not necessarily larger than thickness T1. The relation between the thicknesses may change in accordance with the arrangement of the combiner. For example, in the case shown in FIG. 4, the ray of light incident on combiner 230 travels in a from-upper-to-lower direction when viewed from viewer "D," and the ray of light having exited from combiner 230 travels, to viewer "D," in a from-upper-to-lower direction when viewed from viewer "D." In this case, thickness T1 is larger than thickness T2.

Moreover, FIG. 6B shows the case in which thicknesses T4 and T5 of both ends are larger than thickness T3 of the central portion, with the thickness monotonically increasing from the center portion to both the ends. As shown in FIG. 6B, combiner 230 has the following shape in the effective region in combiner 230, with the effective region corresponding to the viewing region of viewer "D." The shape is such that, in a horizontal cross section of combiner 230, the thickness of the combiner increases at greater distances from the central portion toward at least one of the left end and the right end.

FIG. 7A is a longitudinal cross-sectional view of windshield 120, with the view being taken along the vertical plane passing through the center of an effective region of the windshield 120. FIG. 7B is a transverse cross-sectional view of windshield 120, with the view being taken along the horizontal plane passing through the center of the effective region of the windshield 120. Front surface 120F of windshield 120 is a surface on the side from which the ray of light having exited from display element 310 enters. Rear surface 120R is on the opposite side of the windshield from front surface 120F. As shown in FIG. 7A, the effective region of windshield 120 has a cross-sectional shape in which the thickness of the windshield gradually changes from thickness T1 of the lower end of the windshield to thickness T2 of the upper end. Each of the directional terms "up," "down," "left," and "right" used herein indicates the corresponding direction when viewed from viewer "D." The terms "center of windshield 120" used herein indicate the intersection point of windshield 120 with the line that connects the center of viewing region 400 to the center of virtual image "I." The terms "upper end," "lower end," "left end," and "right end" of windshield 120 used herein indicate the upper end, lower end, left end, and right end of the effective region of windshield 120, respectively. The effective region of windshield 120 is a region, in windshield 120, that corresponds to viewing region 400 of viewer "D." Such a region in windshield 120 is one in which viewer "D" can visually recognize virtual image "I" when looking in windshield 120 from viewing region 400.

FIG. 7A shows the case where thickness T2 of the upper end is larger than thickness T1 of the lower end, with the thickness monotonically increasing from the lower end to the upper end. However, the thickness T2 is not necessarily larger than thickness T1. The relation between the thicknesses may change in accordance with the arrangement of the head-up display. For example, a case is considered where a ray of light incident on the windshield travels in a from-upper-to-lower direction when viewed from the viewer and yet where a ray of light having exited from the windshield travels, to the viewer, in a from-upper-to-lower direction when viewed from the viewer. In this case, thickness T1 is larger than thickness T2.

Moreover, as shown in FIG. 7B, the shape of windshield 120 is such that the thickness of the windshield gradually changes from thickness T3 of the center of the windshield to thicknesses T4 and T5 of the left and right ends. Specifically, the shape is such that T4 is larger than T3 while T5 is smaller than T3. Here, the relation in which T4 is larger than T3 while T5 is smaller than T3 is not necessarily held. The relation between the thicknesses may change in accordance with the arrangement of the head-up display.

As shown in FIG. 7B, in a vehicle with a left-hand steering wheel, the shape of windshield 120 curves toward the viewer "D" side, when it is observed and scanned transversely toward the left side viewed from viewer "D;" thickness T4 is larger than thickness T3 while thickness T5 is smaller than thickness T3. In contrast, in a vehicle with a right-hand steering wheel, the shape of windshield 120 curves toward the viewer "D" side, when it is observed and scanned transversely toward the right side viewed from viewer "D;" thickness T4 is smaller than thickness T3 while thickness T5 is larger than thickness T3.

In both cases of the left-hand steering wheel and right-hand steering wheel vehicles, windshield 120 has the shape as follows: In a horizontal cross section of windshield 120, the thickness of the windshield increases at greater distances from the center toward at least one of the left end and the right end in the effective region in windshield 120, with the effective region corresponding to the viewing region of viewer "D."

Such a shape of each of combiner 230 and windshield 120 enables display lights to be superimposed on one another, with the display lights having been respectively reflected off the front surface and rear surface of a corresponding one of combiner 230 and windshield 120. This prevents the display image from being visually recognized as double images by viewer "D."

FIGS. 9, 11, 13, 15, and 17 are schematic views for illustrating virtual images "I" when viewed from viewing region 400 in cases (comparative examples) where either combiner 230 or windshield 120 according to the corresponding one of the first, second, third, fourth, and fifth embodiments is modified such that the front surface and rear surface have the same shape. Moreover, FIGS. 10, 12, 14, 16, and 18 are schematic views for illustrating virtual images "I" when viewed from viewing region 400 in cases where either combiner 230 or windshield 120 according to the corresponding one of the first, second, third, fourth, and fifth embodiments is used. The shapes of the front surface and rear surface of either combiner 230 or windshield 120 in the corresponding one of these cases will be described using the following first to fifth numerical examples. Viewing region 400 is a rectangle of 50 mm long by 170 mm wide.

In FIGS. 9 to 18, numerical symbols (1) to (9) indicate viewing positions in viewing region 400, and designate schematic illustrations of virtual images "I" when viewed from the corresponding viewing positions. Viewing position (1) is at the center of viewing region 400. Viewing positions (2) and (3) are at the lower end and upper end with respect to the center, respectively. Viewing positions (5), (4), and (6) are at the upper end, center, and lower end on the right end side of viewing region 400, respectively. Viewing positions (8), (7), and (9) are at the upper end, center, and lower end on the left end side of viewing region 400, respectively. Solid lines indicate the virtual images, when viewed from viewing region 400, each of which is produced by a ray of light that has been reflected off either front surface 230F of combiner 230 or front surface 120F of windshield 120. Dashed lines indicate the virtual images, when viewed from viewing region 400, each of which is produced by a ray of light that has been reflected off either rear surface 230R of combiner 230 or rear surface 120R of windshield 120.

As shown in FIGS. 10, 12, 14, 16, and 18, the shape of each of combiner 230 and windshield 120 according to the present disclosure enables an excellent correction of double images over the entire region of viewing region 400. That is, viewer "D" can visually recognize a good virtual image from a location wherever the viewing point is at in viewing region 400.

NUMERICAL EXAMPLES

Hereinafter, specific numerical examples of the head-up displays according to the first to fifth embodiments will be described. Note that, throughout Tables of the numerical examples, the unit of all of the lengths is "mm" (millimeter), and the unit of all of the angles is "°" (degree). Moreover, in each of the numerical examples, a free-form surface is defined by the following equations.

$$z = \frac{cr^2}{1 + \sqrt{1 - (1+k)c^2r^2}} + \sum_{j=2} C_j x^m y^n \qquad \text{Equation 1}$$

$$r = \sqrt{x^2 + y^2} \qquad \text{Equation 2}$$

$$j = \frac{(m+n)^2 + m + 3n}{2} + 1 \qquad \text{Equation 3}$$

In these equations, "z" is the amount of a sag which defines the surface at a position (x, y) from X and Y axes; "c" is the curvature which defines the surface at the origin of the axes; "k" is the conic constant; "m" and "n" are each an integer not smaller than 0 (zero); and Cj is the coefficient of a monomial expression of $x^m y^n$.

Figure 8:
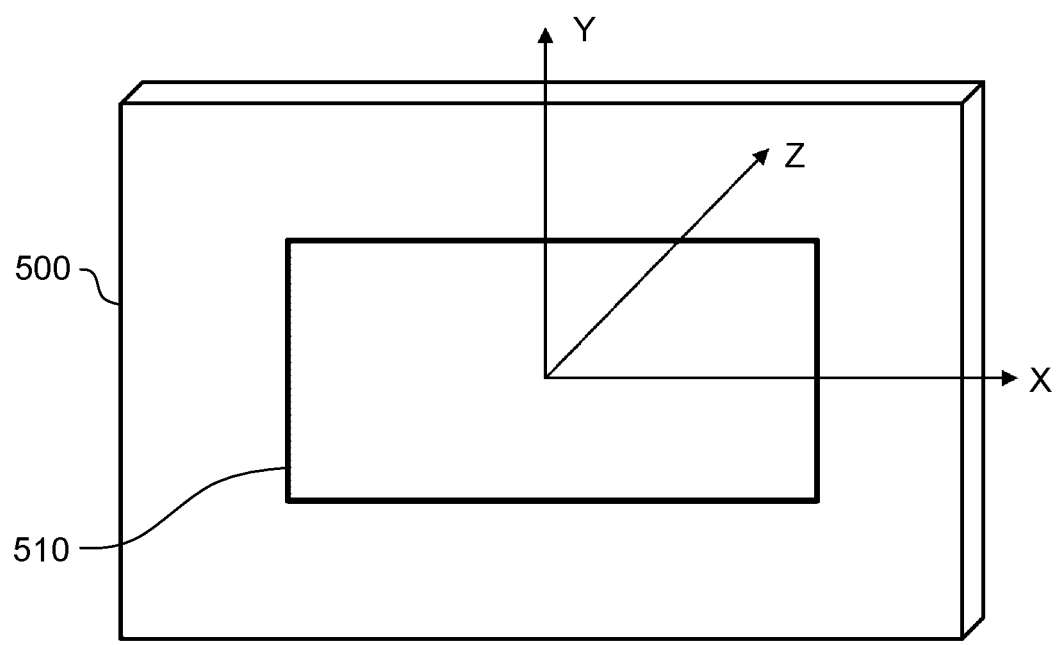
FIG. 8 is a view illustrating a coordinate system for first to fifth numerical examples.
Figure 9:
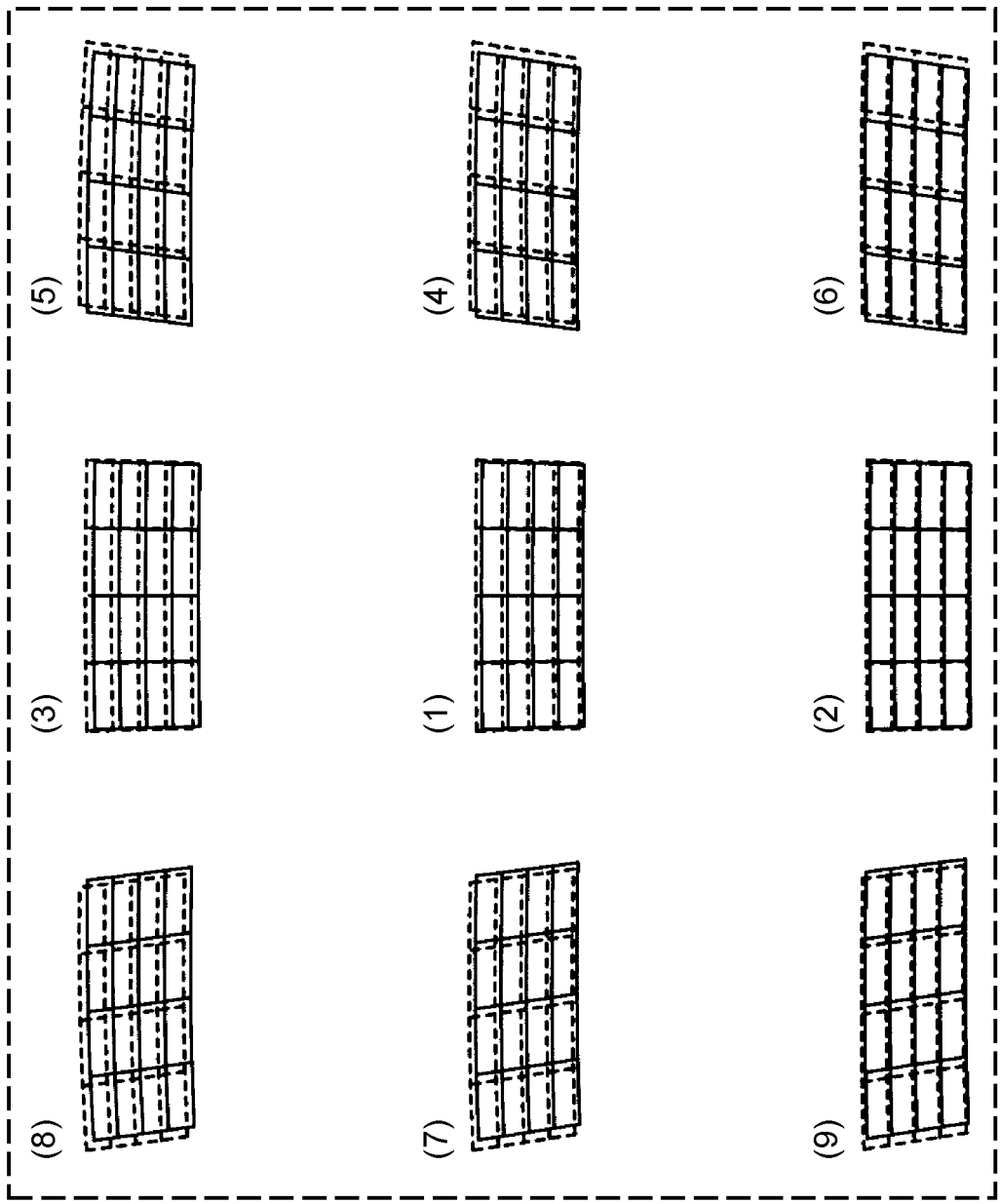
FIG. 9 is a schematic view for illustrating image distortions in a viewing region of a viewer, in a comparative example comparted to the first numerical example.
Figure 10:
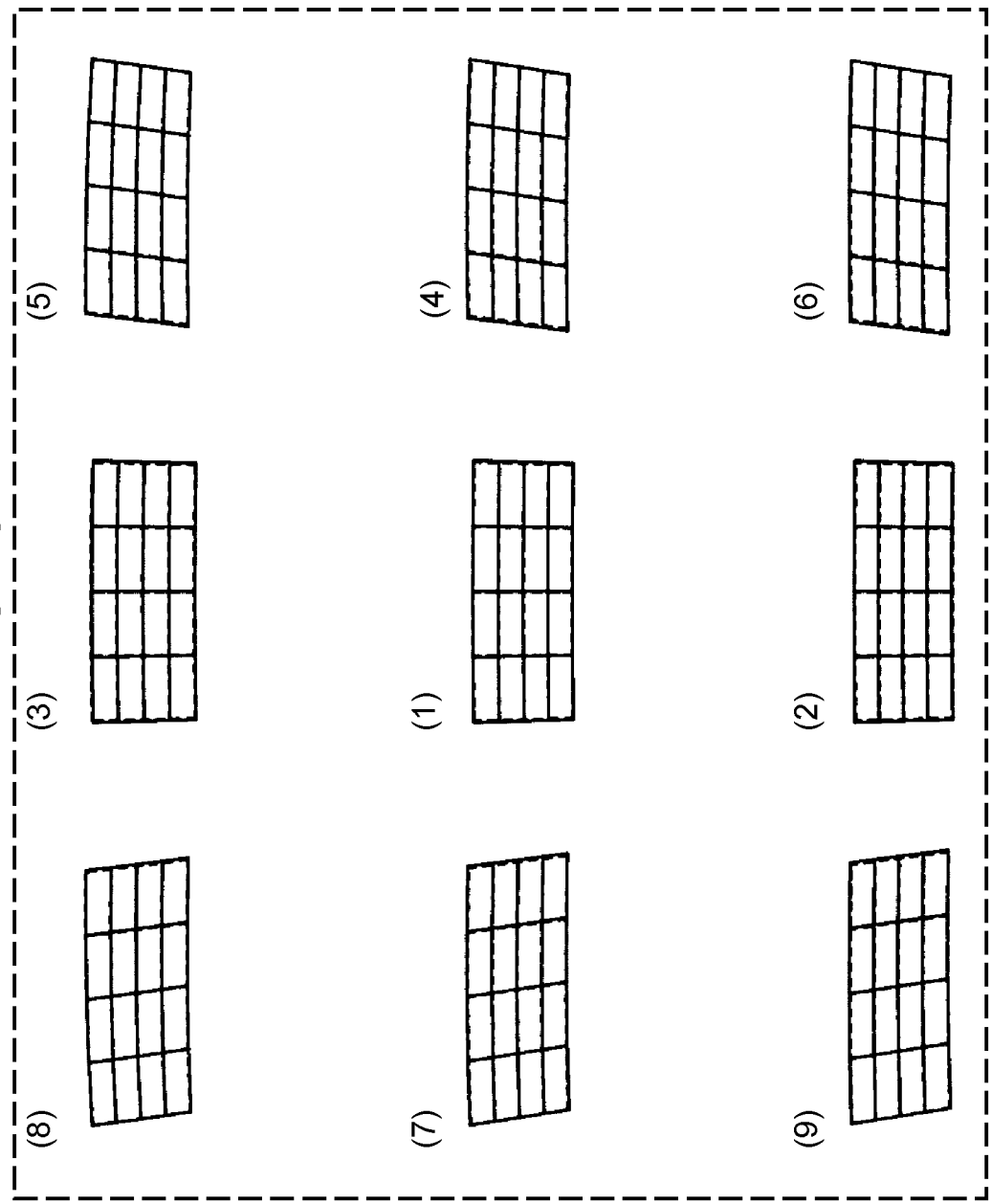
FIG. 10 is a schematic view for illustrating image distortions in a viewing region of a viewer, according to the first numerical example.
Figure 11:
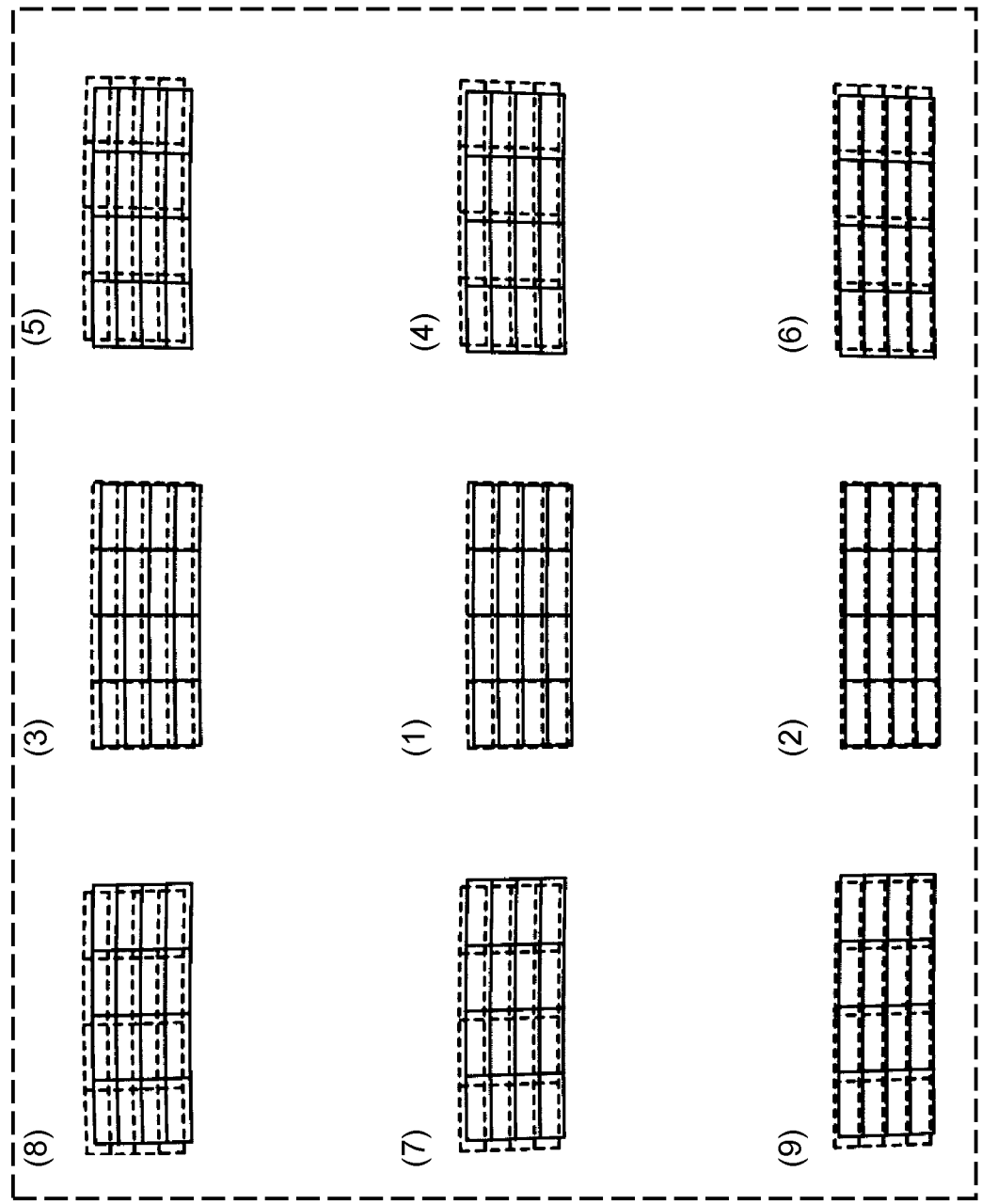
FIG. 11 is a schematic view for illustrating image distortions in a viewing region of a viewer, in a comparative example comparted to the second numerical example.
Figure 12:
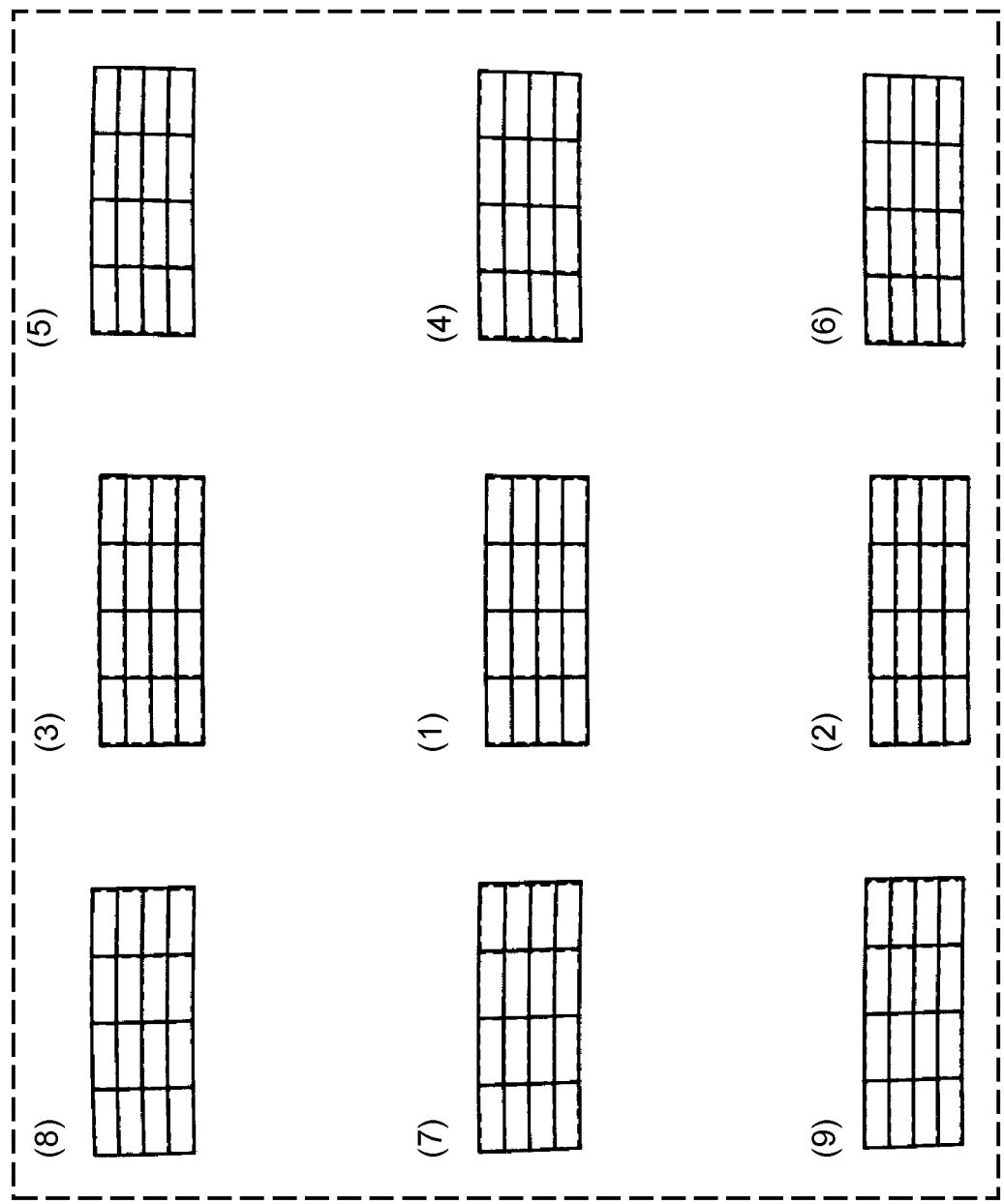
FIG. 12 is a schematic view for illustrating image distortions in a viewing region of a viewer, according to the second numerical example.
Figure 13:
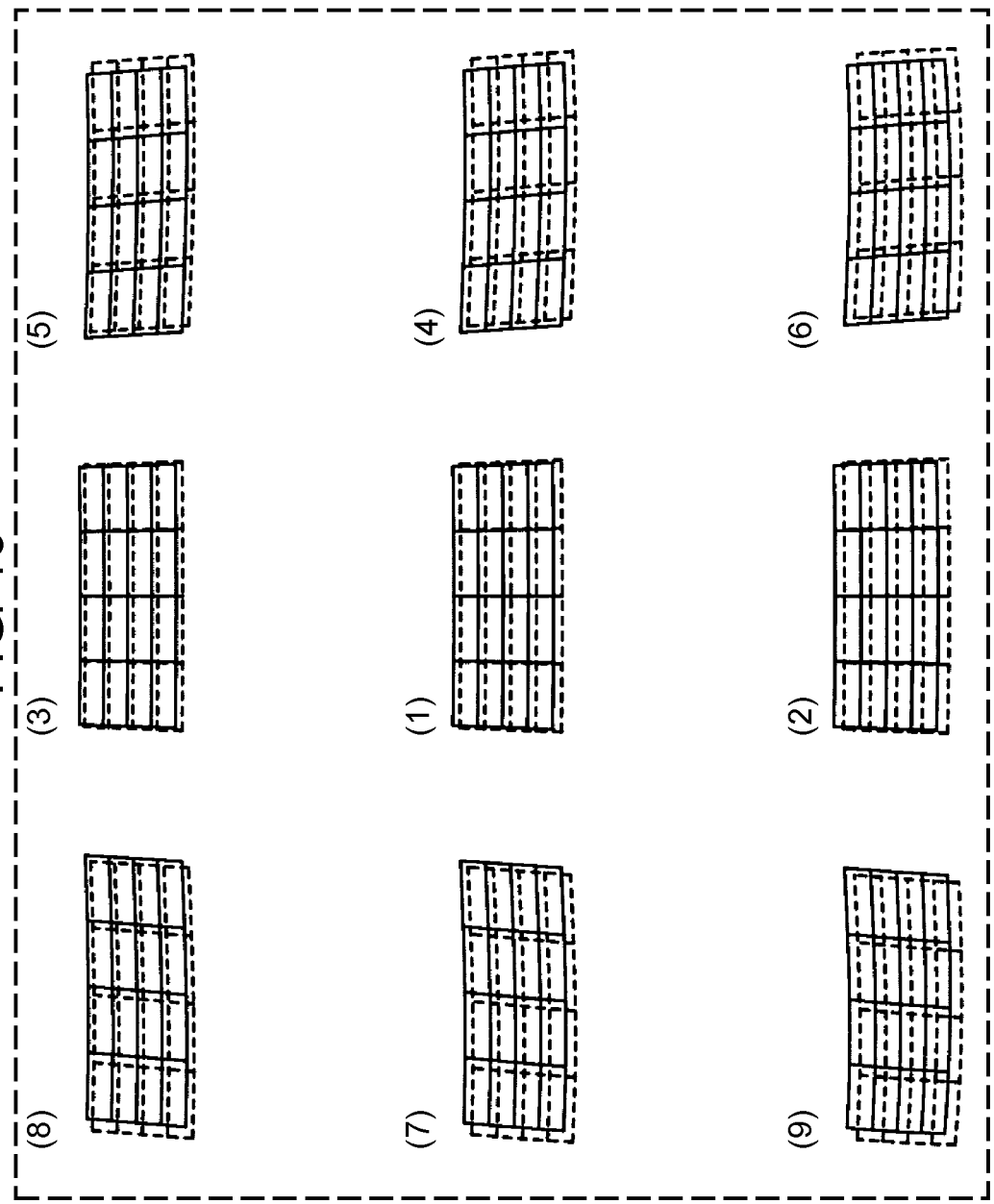
FIG. 13 is a schematic view for illustrating image distortions in a viewing region of a viewer, in a comparative example compared to the third numerical example.
Figure 14:
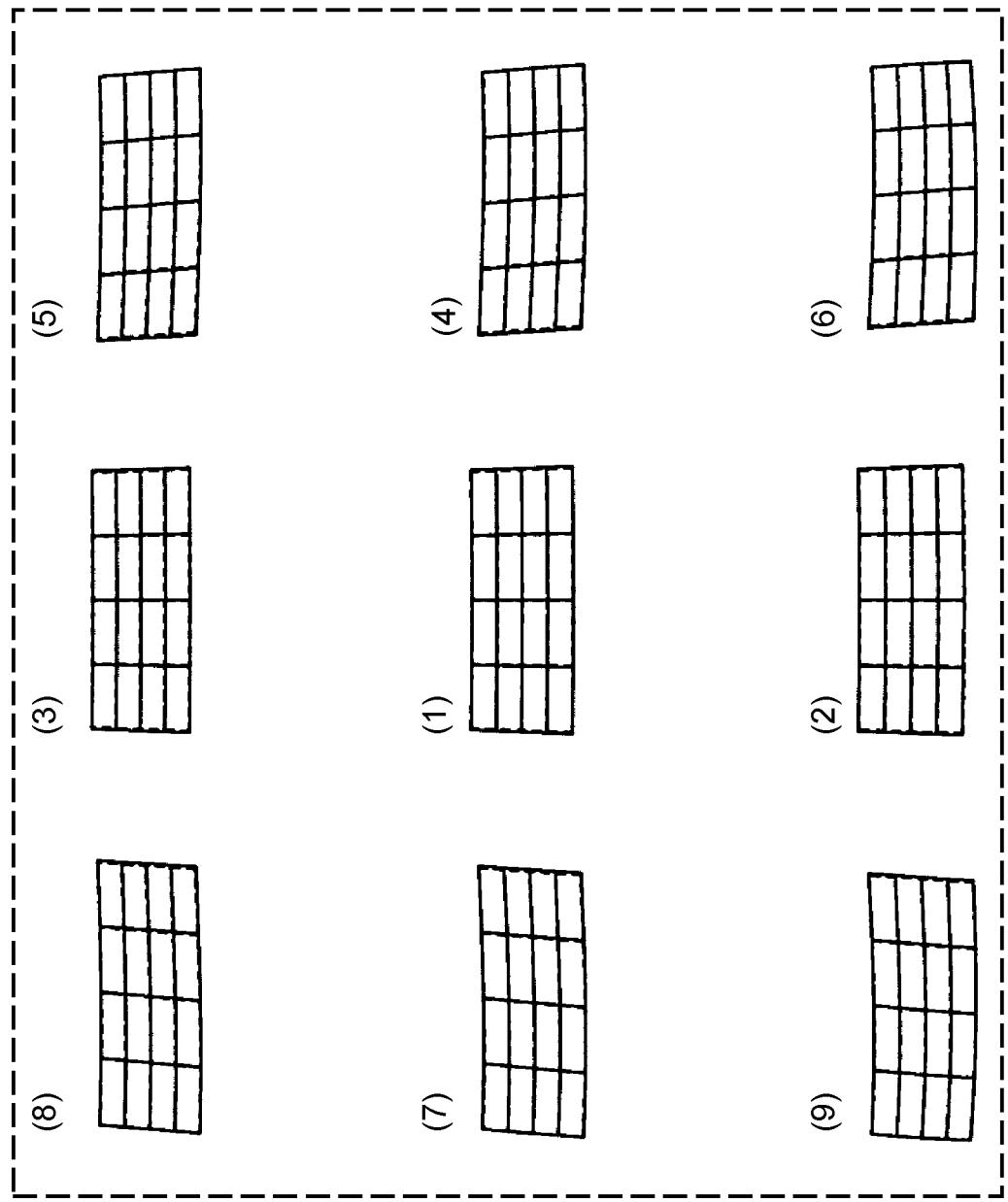
FIG. 14 is a schematic view for illustrating image distortions in a viewing region of a viewer, according to the third numerical example.
Figure 15:
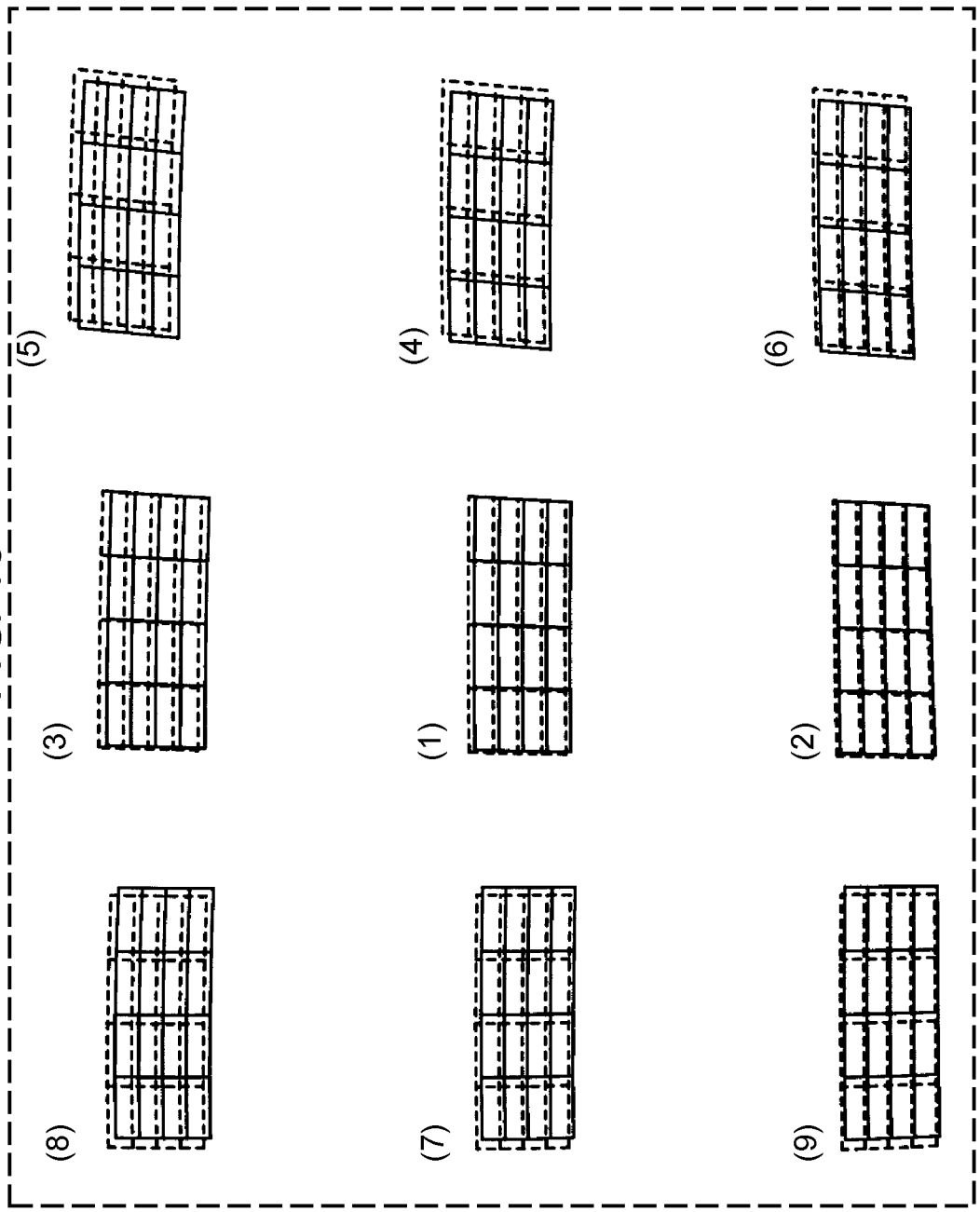
FIG. 15 is a schematic view for illustrating image distortions in a viewing region of a viewer, in a comparative example compared to the fourth numerical example.
Figure 16:
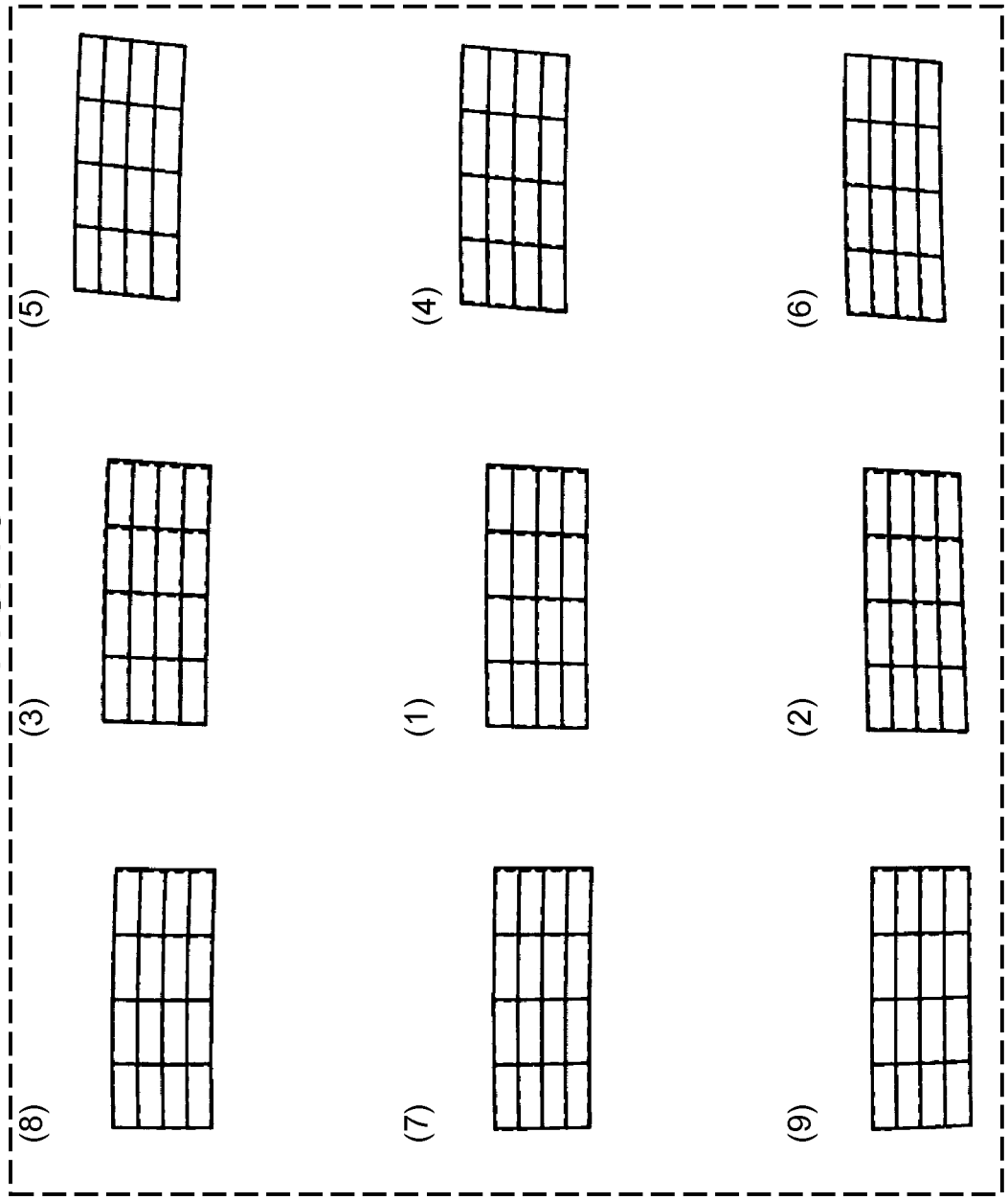
FIG. 16 is a schematic view for illustrating image distortions in a viewing region of a viewer, according to the fourth numerical example.
Figure 17:
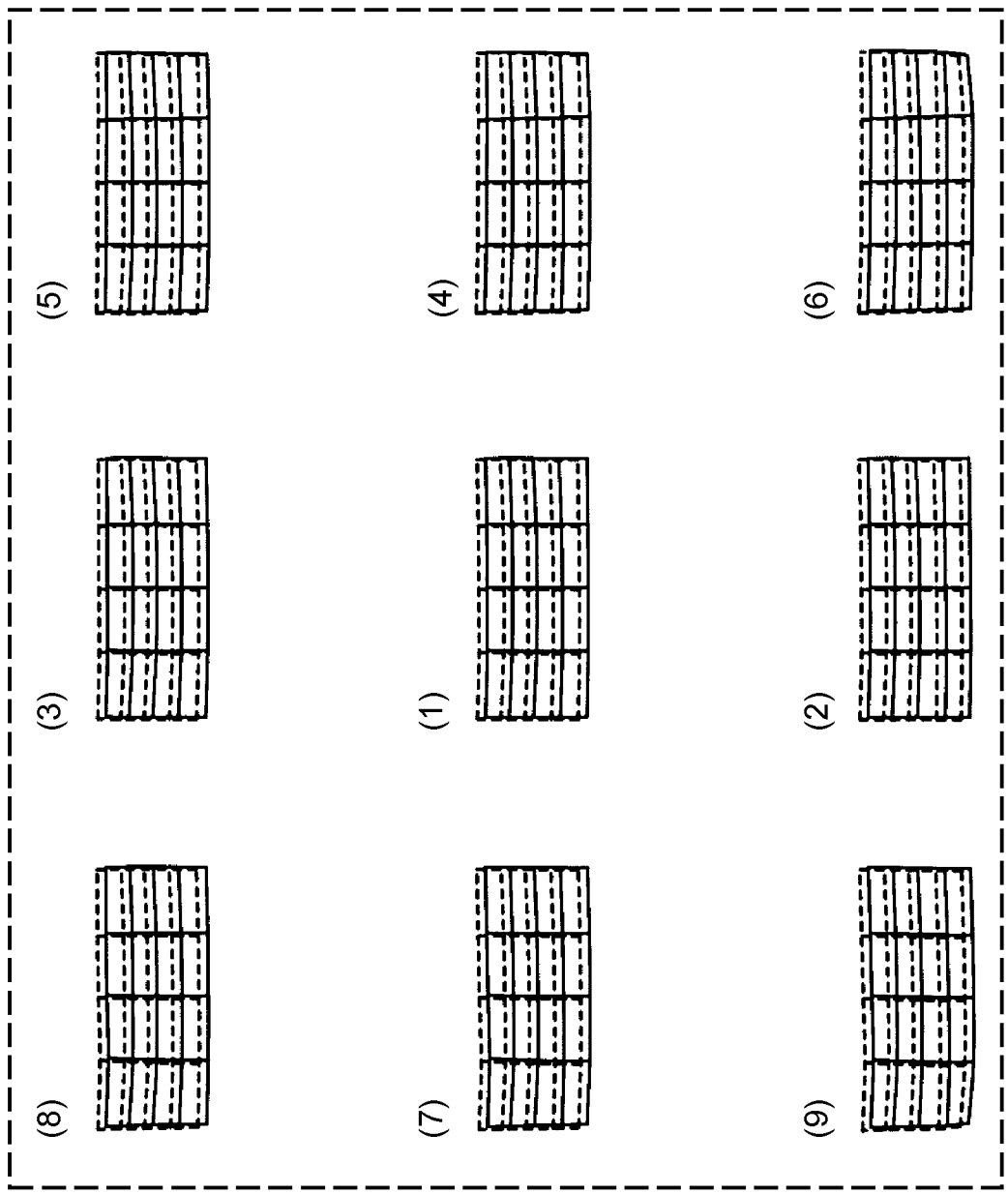
FIG. 17 is a schematic view for illustrating image distortions in a viewing region of a viewer, in a comparative example comparted to the fifth numerical example.
Figure 18:
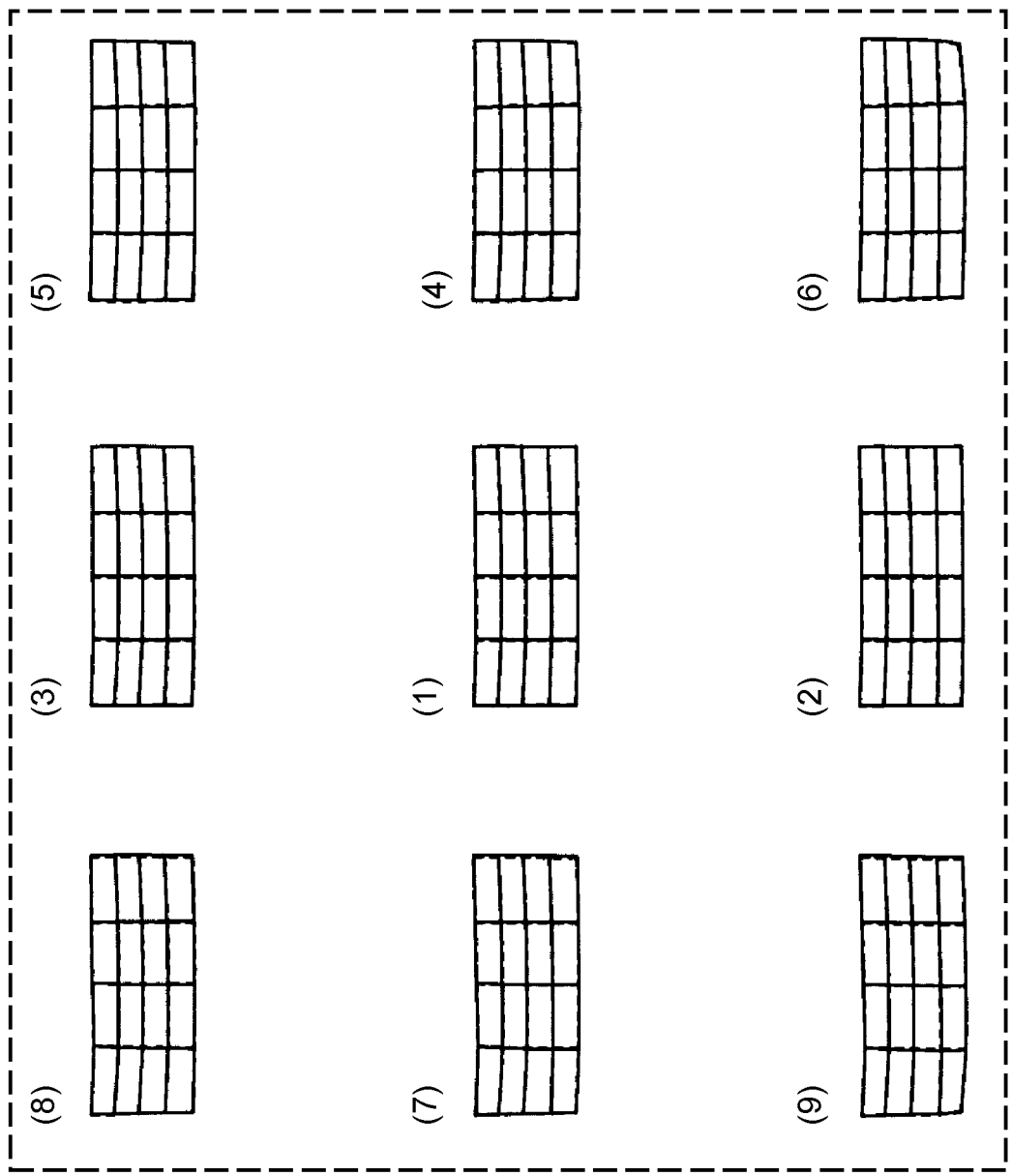
FIG. 18 is a schematic view for illustrating image distortions in a viewing region of a viewer, according to the fifth numerical example.

Moreover, in each of the numerical examples, the origin of the coordinates, serving as a reference, is set at the center of display image 510 of display element 500 (display element 210 or display element 310), and X, Y, and Z axes are defined as shown in FIG. 8.

Moreover, in eccentricity data in each of the numerical examples, "ADE" is the amount of rotation on the X axis, from the Z axis direction to the Y axis direction; "BDE" is the amount of rotation on the Y axis, from the X axis direction to the Z axis direction; and "CDE" is the amount of rotation on the Z axis, from the X axis direction to the Y axis direction.

First Numerical Example

The projection optical system in the first numerical example corresponds to that according to the first embodiment. Table 1 shows configuration data of the projection optical system in the first numerical example. Table 2 shows coefficients of polynomial free-form surfaces. Table 3 shows specifications of the combiner. T1 to T5 in Table 3 are each a material thickness at x and y coordinates in Equation 1, and correspond to T1 to T5 shown in FIGS. 6A and 6B.

TABLE 1

| Surface | | | Eccentricity Data | | | | | |
|---|---|---|---|---|---|---|---|---|
| | Number | Shape | X | Y | Z | ADE | BDE | CDE |
| Display Surface | 1 | | 0 | 0 | 0 | 0 | 0 | 0 |
| Combiner's Front Surface | 2 | Free-Form Surface | 0 | 66.6521 | 254.0940 | 26.5125 | 0 | 0 |
| Combiner's Rear Surface | 3 | Free-Form Surface | 0 | 68.8841 | 258.5682 | 26.5125 | 0 | 0 |
| Viewer | 4 | | 0 | −250.8383 | −147.5347 | 38.3266 | 0 | 0 |

TABLE 2

| Surface Number | | Polynomial Coefficients | | | |
|---|---|---|---|---|---|
| 2 | c(Curvature) | | 0.002776506 | | |
| | C1 | 0.0000.E+00 | C19 | −4.2910.E−11 | |
| | C2 | 0.0000.E+00 | C20 | 0.0000.E+00 | |
| | C3 | 0.0000.E+00 | C21 | −1.7562.E−10 | |
| | C4 | −2.1798.E−03 | C22 | 0.0000.E+00 | |
| | C5 | 0.0000.E+00 | C23 | 0.0000.E+00 | |
| | C6 | −2.1663.E−03 | C24 | 0.0000.E+00 | |
| | C7 | 0.0000.E+00 | C25 | 0.0000.E+00 | |
| | C8 | 1.3418.E−07 | C26 | 0.0000.E+00 | |
| | C9 | 0.0000.E+00 | C27 | 0.0000.E+00 | |
| | C10 | 1.8192.E−07 | C28 | 0.0000.E+00 | |
| | C11 | −3.4803.E−09 | C29 | 0.0000.E+00 | |
| | C12 | 0.0000.E+00 | C30 | 0.0000.E+00 | |
| | C13 | −6.4425.E−09 | C31 | 0.0000.E+00 | |
| | C14 | 0.0000.E+00 | C32 | 0.0000.E+00 | |
| | C15 | −5.3973.E−09 | C33 | 0.0000.E+00 | |
| | C16 | 0.0000.E+00 | C34 | 0.0000.E+00 | |
| | C17 | −1.4853.E−11 | C35 | 0.0000.E+00 | |
| | C18 | 0.0000.E+00 | C36 | 0.0000.E+00 | |
| 3 | c(Curvature) | | 0.002126856 | | |
| | C1 | 0.0000.E+00 | C19 | −4.3241.E−11 | |
| | C2 | 0.0000.E+00 | C20 | 0.0000.E+00 | |
| | C3 | −9.2169.E−04 | C21 | −1.5529.E−10 | |
| | C4 | −1.8446.E−03 | C22 | 0.0000.E+00 | |
| | C5 | 0.0000.E+00 | C23 | 0.0000.E+00 | |
| | C6 | −1.8345.E−03 | C24 | 0.0000.E+00 | |
| | C7 | 0.0000.E+00 | C25 | 0.0000.E+00 | |
| | C8 | 1.4014.E−07 | C26 | 0.0000.E+00 | |
| | C9 | 0.0000.E+00 | C27 | 0.0000.E+00 | |
| | C10 | 1.6462.E−07 | C28 | 0.0000.E+00 | |
| | C11 | −1.9441.E−09 | C29 | 0.0000.E+00 | |
| | C12 | 0.0000.E+00 | C30 | 0.0000.E+00 | |
| | C13 | −2.6689.E−09 | C31 | 0.0000.E+00 | |
| | C14 | 0.0000.E+00 | C32 | 0.0000.E+00 | |
| | C15 | −4.3992.E−09 | C33 | 0.0000.E+00 | |
| | C16 | 0.0000.E+00 | C34 | 0.0000.E+00 | |
| | C17 | −1.4489.E−11 | C35 | 0.0000.E+00 | |
| | C18 | 0.0000.E+00 | C36 | 0.0000.E+00 | |

TABLE 3

Specifications of Combiner

| Shape | nd | vd | T1 | T2 | T3 | T4 | T5 |
|---|---|---|---|---|---|---|---|
| Free-Form Surface | 1.531 | 55.9043 | 4.976 | 5.040 | 5.000 | 5.102 | 5.102 |

| Material Thickness Evaluation Coordinates | x | y |
|---|---|---|
| T1 | 0.000 | 35.000 |
| T2 | 0.000 | −35.000 |
| T3 | 0.000 | 0.000 |
| T4 | −100.000 | 0.000 |
| T5 | 100.000 | 0.000 |

Second Numerical Example

The projection optical system in the second numerical example corresponds to that according to the second embodiment. Table 4 shows configuration data of the projection optical system in the second numerical example. Table 5 shows coefficients of polynomial free-form surfaces. Table 6 shows specifications of the combiner. T1 to T5 in Table 6 are each a material thickness at x and y coordinates in Equation 1, and correspond to T1 to T5 shown in FIGS. 6A and 6B.

TABLE 4

| Surface | | | Eccentricity Data | | | | | |
|---|---|---|---|---|---|---|---|---|
| | Number | Shape | X | Y | Z | ADE | BDE | CDE |
| Display Surface | 1 | | 0 | 0 | 0 | 0 | 0 | 0 |
| Reflection Element | 2 | Plane | 0 | −21.1615 | −77.1504 | 154.2708 | 0 | 0 |
| Combiner's Front Surface | 3 | Free-Form Surface | 0 | −186.6019 | −6.2315 | −54.1588 | 0 | 0 |
| Combiner's Rear Surface | 4 | Free-Form Surface | 0 | −190.6551 | −3.3038 | −54.1588 | 0 | 0 |
| Viewer | 5 | | 0 | 149.3096 | −385.6326 | −41.5208 | 0 | 0 |

TABLE 5

| Surface Number | Polynomial Coefficients | | | |
|---|---|---|---|---|
| 3 | c(Carvature) | 0.002937267 | | |
| | C1 | 0.0000.E+00 | C19 | −1.7897.E−11 |
| | C2 | 0.0000.E+00 | C20 | 0.0000.E+00 |
| | C3 | 0.0000.E+00 | C21 | −6.6971.E−11 |
| | C4 | −2.2781.E−03 | C22 | 0.0000.E+00 |
| | C5 | 0.0000.E+00 | C23 | 0.0000.E+00 |
| | C6 | −2.2495.E−03 | C24 | 0.0000.E+00 |
| | C7 | 0.0000.E+00 | C25 | 0.0000.E+00 |
| | C8 | 1.6830.E−07 | C26 | 0.0000.E+00 |
| | C9 | 0.0000.E+00 | C27 | 0.0000.E+00 |
| | C10 | 4.3898.E−07 | C28 | 0.0000.E+00 |
| | C11 | −4.0967.E−09 | C29 | 0.0000.E+00 |
| | C12 | 0.0000.E+00 | C30 | 0.0000.E+00 |
| | C13 | −7.1870.E−09 | C31 | 0.0000.E+00 |
| | C14 | 0.0000.E+00 | C32 | 0.0000.E+00 |
| | C15 | 6.7906.E−10 | C33 | 0.0000.E+00 |
| | C16 | 0.0000.E+00 | C34 | 0.0000.E+00 |
| | C17 | −6.0362.E−12 | C35 | 0.0000.E+00 |
| | C18 | 0.0000.E+00 | C36 | 0.0000.E+00 |
| 4 | c(Carvature) | 0.00193827 | | |
| | C1 | 0.0000.E+00 | C19 | −1.8263.E−11 |
| | C2 | 0.0000.E+00 | C20 | 0.0000.E+00 |
| | C3 | −9.9204.E−04 | C21 | −4.6136.E−11 |
| | C4 | −1.7684.E−03 | C22 | 0.0000.E+00 |
| | C5 | 0.0000.E+00 | C23 | 0.0000.E+00 |
| | C6 | −1.7434.E−03 | C24 | 0.0000.E+00 |
| | C7 | 0.0000.E+00 | C25 | 0.0000.E+00 |
| | C8 | 1.7653.E−07 | C26 | 0.0000.E+00 |
| | C9 | 0.0000.E+00 | C27 | 0.0000.E+00 |
| | C10 | 3.9586.E−07 | C28 | 0.0000.E+00 |
| | C11 | −1.6950.E−09 | C29 | 0.0000.E+00 |
| | C12 | 0.0000.E+00 | C30 | 0.0000.E+00 |
| | C13 | −1.7808.E−09 | C31 | 0.0000.E+00 |
| | C14 | 0.0000.E+00 | C32 | 0.0000.E+00 |
| | C15 | 2.3624.E−09 | C33 | 0.0000.E+00 |
| | C16 | 0.0000.E+00 | C34 | 0.0000.E+00 |

TABLE 5-continued

| Surface Number | Polynomial Coefficients | | | |
|---|---|---|---|---|
| | C17 | −6.1819.E−12 | C35 | 0.0000.E+00 |
| | C18 | 0.0000.E+00 | C36 | 0.0000.E+00 |

TABLE 6

Specifications of Combiner

| Shape | nd | vd | T1 | T2 | T3 | T4 | T5 |
|---|---|---|---|---|---|---|---|
| Free-Form Surface | 1.531 | 55.9043 | 4.972 | 5.043 | 5 | 5.104 | 5.104 |

| Material Thickness Evaluation Coordinates | x | y |
|---|---|---|
| T1 | 0 | 35 |
| T2 | 0 | −35 |
| T3 | 0 | 0 |
| T4 | −100 | 0 |
| T5 | 100 | 0 |

Third Numerical Example

The projection optical system in the third numerical example corresponds to that according to the third embodiment. Table 7 shows configuration data of the projection optical system in the third numerical example. Table 8 shows coefficients of polynomial free-form surfaces. Table 9 shows specifications of the combiner. T1 to T5 in Table 9 are each a material thickness at x and y coordinates in Equation 1, and correspond to T1 to T5 shown in FIGS. 6A and 6B.

TABLE 7

| Surface | | | Eccentricity Data | | | | | |
|---|---|---|---|---|---|---|---|---|
| | Number | Shape | X | Y | Z | ADE | BDE | CDE |
| Display Surface | 1 | | 0 | 0 | 0 | 0 | 0 | 0 |
| Combiner's Front Surface | 2 | Free-Form Surface | 0 | 64.8012 | 241.8414 | −3.0586 | 0 | 0 |
| Combiner's Rear Surface | 3 | Free-Form Surface | 0 | 64.5344 | 246.8342 | −3.0586 | 0 | 0 |
| Viewer | 4 | | 0 | 269.2582 | −287.5461 | −21.1173 | 0 | 0 |

TABLE 8

| Surface Number | Polynomial Coefficients | | | |
|---|---|---|---|---|
| 3 | c(Curvature) | 2.6920.E−03 | | |
| | C1 | 0.0000.E+00 | C19 | 4.3789.E−11 |
| | C2 | 0.0000.E+00 | C20 | 0.0000.E+00 |
| | C3 | 0.0000.E+00 | C21 | 4.0619.E−11 |
| | C4 | −2.2041.E−03 | C22 | 0.0000.E+00 |
| | C5 | 0.0000.E+00 | C23 | 0.0000.E+00 |
| | C6 | −2.1360.E−03 | C24 | 0.0000.E+00 |
| | C7 | 0.0000.E+00 | C25 | 0.0000.E+00 |
| | C8 | −4.1583.E−07 | C26 | 0.0000.E+00 |
| | C9 | 0.0000.E+00 | C27 | 0.0000.E+00 |
| | C10 | −2.8361.E−07 | C28 | 0.0000.E+00 |
| | C11 | −3.3286.E−09 | C29 | 0.0000.E+00 |
| | C12 | 0.0000.E+00 | C30 | 0.0000.E+00 |
| | C13 | −6.1653.E−09 | C31 | 0.0000.E+00 |
| | C14 | 0.0000.E+00 | C32 | 0.0000.E+00 |
| | C15 | −3.2812.E−10 | C33 | 0.0000.E+00 |
| | C16 | 0.0000.E+00 | C34 | 0.0000.E+00 |
| | C17 | 2.6639.E−11 | C35 | 0.0000.E+00 |
| | C18 | 0.0000.E+00 | C36 | 0.0000.E+00 |
| 4 | c(Curvature) | 2.2392.E−03 | | |
| | C1 | 5.7906.E−09 | C19 | 4.3481.E−11 |
| | C2 | 5.7906.E−09 | C20 | 0.0000.E+00 |
| | C3 | 1.4976.E−03 | C21 | 2.61E−11 |
| | C4 | −1.9664.E−03 | C22 | 0.0000.E+00 |
| | C5 | 0.0000.E+00 | C23 | 0.0000.E+00 |
| | C6 | −1.9035.E−03 | C24 | 0.0000.E+00 |
| | C7 | 0.0000.E+00 | C25 | 0.0000.E+00 |
| | C8 | −4.1936.E−07 | C26 | 0.0000.E+00 |
| | C9 | 0.0000.E+00 | C27 | 0.0000.E+00 |
| | C10 | −2.5584.E−07 | C28 | 0.0000.E+00 |
| | C11 | −2.2347.E−09 | C29 | 0.0000.E+00 |
| | C12 | 0.0000.E+00 | C30 | 0.0000.E+00 |
| | C13 | −3.4293.E−09 | C31 | 0.0000.E+00 |
| | C14 | 0.0000.E+00 | C32 | 0.0000.E+00 |
| | C15 | 5.3032.E−10 | C33 | 0.0000.E+00 |
| | C16 | 0.0000.E+00 | C34 | 0.0000.E+00 |
| | C17 | 2.5816.E−11 | C35 | 0.0000.E+00 |
| | C18 | 0.0000.E+00 | C36 | 0.0000.E+00 |

TABLE 9

Specifications of Combiner

| Shape | nd | vd | T1 | T2 | T3 | T4 | T5 |
|---|---|---|---|---|---|---|---|
| Free-Form Surface | 1.49176 | 57.4414 | 5.060 | 4.954 | 5.000 | 5.114 | 5.114 |

| Material Thickness Evaluation Coordinates | x | y |
|---|---|---|
| T1 | 0.000 | 35.000 |
| T2 | 0.000 | −35.000 |
| T3 | 0.000 | 0.000 |
| T4 | −100.000 | 0.000 |
| T5 | 100.000 | 0.000 |

Fourth Numerical Example

The projection optical system in the fourth numerical example corresponds to that according to the fourth embodiment. Table 10 shows configuration data of the projection optical system in the fourth numerical example. Table 11 shows coefficients of polynomial free-form surfaces. Table 12 shows specifications of the combiner. T1 to T5 in Table 12 are each a material thickness at x and y coordinates in Equation 1, and correspond to T1 to T5 shown in FIGS. 6A and 6B.

TABLE 10

| Surface | | Eccentricity Data | | | | | |
|---|---|---|---|---|---|---|---|
| Number | Shape | X | Y | Z | ADE | BDE | CDE |
| Display Surface 1 | | 0 | 0 | 0 | 0 | 0 | 0 |
| Reflection Element 2 | Plane | 23.69056 | −18.8464 | −95.0271 | 158.4785 | −11.9884 | −3.5722 |
| Combiner's Front Surface 3 | Free-Form Surface | 3.94435 | −155.4658 | 6.2300 | −39.9007 | 6.3646 | 9.3336 |
| Combiner's Rear Surface 4 | Free-Form Surface | 3.39008 | −158.6534 | 10.0421 | −39.9007 | 6.3646 | 9.3336 |
| Viewer 5 | | 50.62999 | 49.6442 | −407.4952 | −22.8106 | 11.835 | 7.0677 |

TABLE 11

| Surface Number | Polynomial Coefficients | | | |
|---|---|---|---|---|
| 3 | c(Curvature) | | 2.9343.E−03 | |
| | C1 | 0.0000.E+00 | C19 | 2.2102.E−11 |
| | C2 | 0.0000.E+00 | C20 | 1.3776.E−10 |
| | C3 | 0.0000.E+00 | C21 | −1.2970.E−10 |
| | C4 | −2.2582.E−03 | C22 | 0.0000.E+00 |
| | C5 | 7.0626.E−05 | C23 | 0.0000.E+00 |
| | C6 | −2.2094.E−03 | C24 | 0.0000.E+00 |
| | C7 | −1.9830.E−07 | C25 | 0.0000.E+00 |
| | C8 | 1.9325.E−07 | C26 | 0.0000.E+00 |
| | C9 | −2.1687.E−07 | C27 | 0.0000.E+00 |
| | C10 | 4.8046.E−07 | C28 | 0.0000.E+00 |
| | C11 | −4.1676.E−09 | C29 | 0.0000.E+00 |
| | C12 | −2.4881.E−10 | C30 | 0.0000.E+00 |
| | C13 | −6.9723.E−09 | C31 | 0.0000.E+00 |
| | C14 | 5.6674.E−09 | C32 | 0.0000.E+00 |
| | C15 | −1.6794.E−09 | C33 | 0.0000.E+00 |
| | C16 | −2.0158.E−12 | C34 | 0.0000.E+00 |
| | C17 | −9.3226.E−12 | C35 | 0.0000.E+00 |
| | C18 | −1.5933.E−11 | C36 | 0.0000.E+00 |
| 4 | c(Curvature) | | 2.4363.E−03 | |
| | C1 | 0.0000.E+00 | C19 | 2.2696.E−11 |
| | C2 | 0.0000.E+00 | C20 | 1.4261.E−10 |
| | C3 | −1.0410.E−03 | C21 | −1.0897.E−10 |
| | C4 | −1.9990.E−03 | C22 | 0.0000.E+00 |
| | C5 | 6.9122.E−05 | C23 | 0.0000.E+00 |
| | C6 | −1.9549.E−03 | C24 | 0.0000.E+00 |
| | C7 | −2.3383.E−07 | C25 | 0.0000.E+00 |
| | C8 | 1.9206.E−07 | C26 | 0.0000.E+00 |

TABLE 11-continued

| Surface Number | Polynomial Coefficients | | | |
|---|---|---|---|---|
| | C9 | −2.4537.E−07 | C27 | 0.0000.E+00 |
| | C10 | 4.3929.E−07 | C28 | 0.0000.E+00 |
| | C11 | −2.7438.E−09 | C29 | 0.0000.E+00 |
| | C12 | −1.7195.E−10 | C30 | 0.0000.E+00 |
| | C13 | −3.4594.E−09 | C31 | 0.0000.E+00 |
| | C14 | 5.2986.E−09 | C32 | 0.0000.E+00 |
| | C15 | −9.0529.E−10 | C33 | 0.0000.E+00 |
| | C16 | 4.3242.E−13 | C34 | 0.0000.E+00 |
| | C17 | −8.5824.E−12 | C35 | 0.0000.E+00 |
| | C18 | −1.2842.E−11 | C36 | 0.0000.E+00 |

TABLE 12

Specifications of Combiner

| Shape | nd | vd | T1 | T2 | T3 | T4 | T5 |
|---|---|---|---|---|---|---|---|
| Free-Form Surface | 1.49176 | 57.4414 | 4.969 | 5.043 | 5.000 | 5.112 | 5.090 |

| Material Thickness Evaluation Coordinates | x | y |
|---|---|---|
| T1 | 0.000 | 35.000 |
| T2 | 0.000 | −35.000 |
| T3 | 0.000 | 0.000 |
| T4 | −100.000 | 0.000 |
| T5 | 100.000 | 0.000 |

Fifth Numerical Example

The projection optical system in the fifth numerical example corresponds to that according to the fifth embodiment. Table 13 shows configuration data of the projection optical system in the fifth numerical example. Table 14 shows coefficients of polynomial free-form surfaces. Table 15 shows specifications of the windshield. T1 to T5 in Table 15 are each a material thickness at x and y coordinates in Equation 1, and correspond to T1 to T5 shown in FIGS. 7A and 7B.

TABLE 13

| Surface | | | Eccentricity Data | | | | | |
|---|---|---|---|---|---|---|---|---|
| | Number | Shape | X | Y | Z | ADE | BDE | CDE |
| Display Surface | 1 | | 0 | 0 | 0 | 0 | 0 | 0 |
| First Mirror | 2 | Free-Form Surface | −0.10066 | 10.35273 | 38.63691 | −18.6506 | −1.2724 | 0.7698 |
| Second Mirror | 3 | Free-Form Surface | −3.25861 | 73.62755 | −10.21311 | −17.6384 | −2.8644 | 1.5035 |
| Windshield's Front Surface | 4 | Free-Form Surface | 4.5599 | 136.36839 | 168.28148 | 142.2313 | −5.3783 | 15.3812 |
| Windshield's Rear Surface | 5 | Free-Form Surface | 5.12228 | 140.02706 | 163.55942 | 142.2313 | −5.3783 | 15.3812 |
| Viewer | 6 | | −58.51654 | −360.1382 | 948.77496 | 142.2313 | −5.3783 | 15.3812 |

TABLE 14

| Surface Number | Polynomial Coefficients | | | |
|---|---|---|---|---|
| 2 | c(Curvature) | | 1.1207.E−02 | |
| | C1 | 0.0000.E+00 | C19 | −1.5854.E−08 |
| | C2 | 0.0000.E+00 | C20 | −4.9352.E−09 |
| | C3 | 0.0000.E+00 | C21 | 3.4570.E−08 |
| | C4 | −3.3955.E−03 | C22 | 8.9481.E−11 |
| | C5 | −1.3320.E−04 | C23 | 2.6917.E−11 |
| | C6 | −5.5411.E−03 | C24 | −2.2321.E−10 |
| | C7 | 2.8409.E−06 | C25 | 2.0953.E−11 |
| | C8 | −1.5267.E−05 | C26 | 3.6129.E−10 |
| | C9 | 2.6042.E−06 | C27 | 1.8581.E−10 |
| | C10 | −2.1391.E−05 | C28 | −3.8333.E−10 |
| | C11 | −6.5334.E−07 | C29 | 0.0000.E+00 |
| | C12 | −8.8211.E−08 | C30 | 0.0000.E+00 |
| | C13 | −9.5366.E−08 | C31 | 0.0000.E+00 |

TABLE 14-continued

| Surface Number | Polynomial Coefficients | | | |
|---|---|---|---|---|
| | C14 | −1.7568.E−07 | C32 | 0.0000.E+00 |
| | C15 | −5.4531.E−07 | C33 | 0.0000.E+00 |
| | C16 | −2.2916.E−10 | C34 | 0.0000.E+00 |
| | C17 | 7.2559.E−09 | C35 | 0.0000.E+00 |
| | C18 | 1.0544.E−09 | C36 | 0.0000.E+00 |
| 3 | c(Curvature) | −1.2801.E−03 | | |
| | C1 | 0.0000.E+00 | C19 | −2.3176.E−10 |
| | C2 | 0.0000.E+00 | C20 | −5.3817.E−11 |
| | C3 | 0.0000.E+00 | C21 | 4.2077.E−10 |
| | C4 | 2.6756.E−03 | C22 | 3.8579.E−13 |
| | C5 | −8.1959.E−05 | C23 | 8.9571.E−14 |
| | C6 | 1.8046.E−03 | C24 | −1.5595.E−12 |
| | C7 | 4.9954.E−09 | C25 | 4.2917.E−13 |
| | C8 | −4.7935.E−06 | C26 | 4.7577.E−12 |
| | C9 | 1.0523.E−07 | C27 | 1.5700.E−12 |
| | C10 | −3.4600.E−06 | C28 | −2.0811.E−12 |
| | C11 | −5.5931.E−09 | C29 | 0.0000.E+00 |
| | C12 | −1.9268.E−09 | C30 | 0.0000.E+00 |
| | C13 | 1.8496.E−08 | C31 | 0.0000.E+00 |
| | C14 | −7.9645.E−09 | C32 | 0.0000.E+00 |
| | C15 | −6.9779.E−09 | C33 | 0.0000.E+00 |
| | C16 | −6.3684.E−13 | C34 | 0.0000.E+00 |
| | C17 | 6.0468.E−11 | C35 | 0.0000.E+00 |
| | C18 | 2.0036.E−11 | C36 | 0.0000.E+00 |
| 4 | c(Curvature) | 9.6494.E−04 | | |
| | C1 | 0.0000.E+00 | C19 | −1.0831.E−12 |
| | C2 | 2.8927.E−01 | C20 | 3.1717.E−14 |
| | C3 | 1.6867.E+00 | C21 | 8.7288.E−13 |
| | C4 | −1.3578.E−03 | C22 | −3.4952.E−14 |
| | C5 | −3.5561.E−06 | C23 | 6.7891.E−17 |
| | C6 | −1.1300.E−03 | C24 | −4.8522.E−14 |
| | C7 | 5.8509.E−08 | C25 | −4.1448.E−17 |
| | C8 | −9.6733.E−08 | C26 | 9.0027.E−15 |
| | C9 | −1.3382.E−07 | C27 | 1.4376.E−17 |
| | C10 | −1.0626.E−07 | C28 | −1.0902.E−15 |
| | C11 | 2.6917.E−10 | C29 | 0.0000.E+00 |
| | C12 | −9.4272.E−11 | C30 | 0.0000.E+00 |
| | C13 | 7.9349.E−10 | C31 | 0.0000.E+00 |
| | C14 | 5.0684.E−11 | C32 | 0.0000.E+00 |
| | C15 | 1.4182.E−09 | C33 | 0.0000.E+00 |
| | C16 | 7.7588.E−14 | C34 | 0.0000.E+00 |
| | C17 | 5.5244.E−12 | C35 | 0.0000.E+00 |
| | C18 | 2.3747.E−15 | C36 | 0.0000.E+00 |
| 5 | c(Curvature) | 9.7017.E−04 | | |
| | C1 | 0.0000.E+00 | C19 | −4.8352.E−12 |
| | C2 | 2.8923.E−01 | C20 | 6.6357.E−11 |
| | C3 | 1.6816.E+00 | C21 | −2.1275.E−11 |
| | C4 | −1.3578.E−03 | C22 | −4.0165.E−14 |
| | C5 | −3.6151.E−06 | C23 | 5.4968.E−14 |
| | C6 | −1.1294.E−03 | C24 | −1.0040.E−13 |
| | C7 | −1.2234.E−07 | C25 | 2.8303.E−13 |
| | C8 | −5.3512.E−08 | C26 | 1.8952.E−14 |
| | C9 | −3.8127.E−07 | C27 | 7.5516.E−13 |
| | C10 | −9.6143.E−08 | C28 | 7.1448.E−14 |
| | C11 | 3.8620.E−10 | C29 | 0.0000.E+00 |
| | C12 | −8.8484.E−10 | C30 | 0.0000.E+00 |
| | C13 | 9.4072.E−10 | C31 | 0.0000.E+00 |
| | C14 | −2.0440.E−09 | C32 | 0.0000.E+00 |
| | C15 | −9.6693.E−10 | C33 | 0.0000.E+00 |
| | C16 | 9.3948.E−12 | C34 | 0.0000.E+00 |
| | C17 | 2.2480.E−12 | C35 | 0.0000.E+00 |
| | C18 | 2.1167.E−11 | C36 | 0.0000.E+00 |

TABLE 15

| Specifications of Windshield | | | | | | | |
|---|---|---|---|---|---|---|---|
| Shape | nd | vd | T1 | T2 | T3 | T4 | T5 |
| Free-Form Surface | 1.5168 | 64.1664 | 5.794 | 6.357 | 6.000 | 6.124 | 5.942 |

| Material Thickness Evaluation Coordinates | x | y |
|---|---|---|
| T1 | 0.000 | 40.000 |
| T2 | 0.000 | −70.000 |
| T3 | 0.000 | 0.000 |
| T4 | −100.000 | 0.000 |
| T5 | 100.000 | 0.000 |

The head-up displays according to the present disclosure are particularly effectively applicable for use in head-up displays, such as vehicle-mounted head-up displays, which require high image quality.

What is claimed is:

1. A head-up display, comprising:
a display element for displaying an image; and
a projection optical system for projecting, onto a viewing region of a viewer, the image displayed on the display element, the projection optical system including
a combiner disposed at a position in an optical path from the display element to the viewing region of the viewer,
wherein the combiner includes a front surface at which light incident from the display element enters, the front surface having a curved surface shape, the combiner having a center, an upper end, a lower end, a right end, a left end and an effective region corresponding to the viewing region of the viewer;
the effective region of the combiner is configured to have a longitudinal cross-sectional shape in which a thickness of the combiner gradually decreases from the upper end to the lower end or gradually decreases from the lower end to the upper end,
the effective region of the combiner is configured to have a transverse cross-sectional shape in which the thickness of the combiner gradually increases from the center to the left end when viewed from the viewer, and
the effective region of the combiner is configured to have a transverse cross-sectional shape in which the thickness of the combiner gradually increases from the center to the right end when viewed from the viewer.

2. The head-up display according to claim 1, further comprising a reflection element for reflecting the image displayed on the display element so as to guide the image to the viewer.

3. The head-up display according to claim 1,
wherein the combiner includes a rear surface, and
each of the front and rear surfaces has a shape curving outward in a middle portion of the corresponding surface when viewed from the viewer.

4. The head-up display according to claim 1,
wherein the combiner includes a rear surface, and
each of the front and rear surfaces has a free-form surface shape.

5. A head-up display, comprising:
a display element for displaying an image; and
a projection optical system for projecting, onto a viewing region of a driver of a vehicle, the image displayed on the display element, the projection optical system including a windshield disposed at a position in an optical path from the display element to the viewing region of the driver,
wherein the windshield includes a front surface at which light incident from the display element enters, the front surface having a curved surface shape, the windshield having a center, an upper end, a lower end, a right end, a left end and an effective region corresponding to the viewing region of the driver; if the viewer looks up the windshield, the effective region of the windshield is configured to have a longitudinal cross sectional shape in which the thickness of the windshield gradually decreases from the lower end to the upper end,
the effective region of the windshield is configured to have, for a left hand steering wheel vehicle, a transverse cross-sectional shape in which the thickness of the windshield gradually increases from the center to the left end when viewed from the driver, and
the effective region of the windshield is configured to have, for a right hand steering wheel vehicle, a transverse cross-sectional shape in which the thickness of the windshield gradually increases from the center to the right end when viewed from the driver.

6. The head-up display according to claim 5, further comprising a reflection element for reflecting the image displayed on the display element so as to guide the image to the driver.

7. The head-up display according to claim 5,
wherein the windshield includes a rear surface, and
each of the front and rear surfaces has a shape curving outward in a middle portion of the corresponding surface when viewed from the driver.

8. The head-up display according to claim 5,
wherein the windshield includes a rear surface, and
each of the front and rear surfaces has a free-form surface shape.

9. The head-up display according to claim 5,
wherein the projection optical system includes a reflection element group disposed at a position in an optical path from the display element to the windshield, and reflected surfaces of the reflection element group are concave.

* * * * *